(12) United States Patent
Chiu et al.

(10) Patent No.: US 9,120,359 B2
(45) Date of Patent: Sep. 1, 2015

(54) METHOD AND SYSTEM FOR STABILITY CONTROL

(71) Applicant: Honda Motor Co., Ltd., Tokyo (JP)

(72) Inventors: Jimmy Chiu, San Jose, CA (US); Ambarish Goswami, Fremont, CA (US); James W. Post, II, Dublin, OH (US); Byung-Joo Kim, Ann Arbor, MI (US); Lowell Brown, Birmingham, AL (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/564,776

(22) Filed: Dec. 9, 2014

(65) Prior Publication Data

US 2015/0165850 A1 Jun. 18, 2015

Related U.S. Application Data

(60) Provisional application No. 61/915,969, filed on Dec. 13, 2013.

(51) Int. Cl.
| | |
|---|---|
| *A01B 69/00* | (2006.01) |
| *B62D 6/00* | (2006.01) |
| *B63H 25/04* | (2006.01) |
| *G05D 1/00* | (2006.01) |
| *G06F 7/00* | (2006.01) |
| *G06F 19/00* | (2011.01) |

(Continued)

(52) U.S. Cl.
CPC ........................................ *B60D 1/30* (2013.01)

(58) Field of Classification Search
CPC ....................................................... B60D 1/30

USPC ............................................................ 701/41
See application file for complete search history.

(56) References Cited

U.S. PATENT DOCUMENTS 6,655,710 B2 12/2003 Lindell et al.
7,640,089 B2 12/2009 Deng et al.
(Continued)

FOREIGN PATENT DOCUMENTS

JP 2011025921 2/2011

OTHER PUBLICATIONS

Article: Sundling, H: "Tuson Sway Control, trailer sway and stability control for safer trailer towing", Nov. 30, 2013, http://www.examiner.com/review/tuson-sway-control-trailer-sway-and-stability-control-for-safer-trailer-towing.

(Continued)

*Primary Examiner* — Maceeh Anwari
(74) *Attorney, Agent, or Firm* — Rankin, Hill & Clark LLP

(57) ABSTRACT

A method for stability control may include receiving vehicle characteristics of a vehicle of a vehicle-trailer system, trailer characteristics of a trailer of the vehicle-trailer system, or steering inputs for the vehicle. The method may include determining a prediction based on yaw rate deviation for the vehicle determined from the vehicle characteristics, trailer characteristics, or steering inputs or hitch rate oscillation of a hitch coupling the vehicle to the trailer determined from the vehicle characteristics, trailer characteristics, or steering inputs, where the prediction may be indicative of a likelihood of instability for the vehicle-trailer system. The method may include generating control actions based on the prediction and hitch rate feedback from the hitch of the vehicle-trailer system or lateral hitch force feedback.

20 Claims, 12 Drawing Sheets

(51) Int. Cl.
  *G06F 17/00* (2006.01)
  *B60D 1/30* (2006.01)

(56) References Cited

U.S. PATENT DOCUMENTS

| | | | |
|---|---|---|---|
| 7,905,555 | B2 | 3/2011 | Huntimer |
| 8,308,182 | B2 | 11/2012 | Ortmann et al. |
| 8,326,504 | B2 | 12/2012 | Wu et al. |
| 8,365,849 | B2 | 2/2013 | Bartel |
| 8,571,777 | B2 | 10/2013 | Greene |
| 2008/0036296 | A1 | 2/2008 | Wu et al. |
| 2008/0172163 | A1 | 7/2008 | Englert et al. |
| 2011/0022282 | A1 | 1/2011 | Wu et al. |
| 2013/0191000 | A1 | 7/2013 | Hahne |

OTHER PUBLICATIONS

Bortoni-Anzures, et al.; "Fuzzy controller for automatic steering in heavy vehicle semi-trailers", Ingeniería Investigación y Tecnología, vol. XIV (número1), Jan.-Mar. 2013, pp. 1-9.

Article: Yang, et al.: "Simulation of predictive control for vehicle yaw stability on curve", Journal of Highway and Transportation Research and Development29.10 (Oct. 2012): pp. 149-153. http://en.cnki.com.cn/Article_en/CJFDTOTAL-GLJK201210029.htm.

Article: Chen, et al.: "Jackknife prevention for articulated vehicles using model reference adaptive control", Y-A Proceedings of the Institution of Mechanical Engineers, Part D: Journal of Automobile Engineering Jan. 1, 2011 vol. 225 No. 1, pp. 28-42. http://pid.sagepub.com/content/225/1/28.abstract.

ebuggy GmbH, "A global solution for electric mobility.", https://ebuggy.wordpress.com/about/ Accessed: Dec. 18, 2014.

J. Chiu and A. Goswami, "Driver assist for backing-up a vehicle with a long-wheelbase dual-axle trailer," in International Symposium on Advanced Vehicle Control (AVEC), (Seoul, Korea), KSAE, Sep. 2012. http://www.ambarish.com/paper/Chiu_Goswami_AVEC12_final.pdf.

W. Deng and X. Kang, "Parametric study on vehicle-trailer dynamics for stability control," Technical Report 2003-01-1321, SAE, 2003. http://papers.sae.org/2003-01-1321/.

X. Kang and W. Deng, "Vehicle-trailer handling dynamics and stability control—an engineering review," SAE Technical Paper 200701-0822, SAE, Detroit, Michigan, Apr. 2007.

M. Bouteldja, A. Koita, V. Dolcemascolo, and J. C. Cadiou, "Prediction and detection of jackknifing problems for tractor semi-trailer," in IEEE Vehicle Power and Propulsion Conference, (Windsor, Canada), pp. 1-6, IEEE, Sep. 2006.

J. Stergiopoulos and S. Manesis, "Anti-jackknife state feedback control law for nonholonomic vehicles with trailer sliding mechanism," Int. J. Systems, Control and Communications, vol. 1, No. 3, pp. 297-311, 2009.

A. D. Jayakaran, "Enhanced trailer backing," Master's thesis, University of Florida, 2004, http://cimar.mae.ufl.edu/CIMAR/pages/thesis/jayakaran_a.pdf.

A. L. Dunn, "Jackknife Stability of Articulated Tractor Semitrailer Vehicles With High-output Brakes and Jackknife Detection on Low Coefficient Surfaces". PhD thesis, Ohio State University, 2003. https://etd.ohiolink.edu/ap/10?0::NO:10:P10_ACCESSION_NUM:osu1061328963.

METHOD AND SYSTEM FOR STABILITY CONTROL

CROSS-REFERENCE TO RELATED APPLICATIONS

This application claims the benefit of U.S. Provisional Patent Application, Ser. No. 61/915,969, entitled "TRAILER STABILITY CONTROL FOR LONG-WHEELBASED STEERED TRAILERS AND METHOD THEREFOR", filed on Dec. 13, 2013; the entirety of the above-noted application is incorporated by reference herein.

BACKGROUND

Generally, long-wheelbase trailers provide support for a vertical load between two or more axles of a trailer, which may be towed, connected, or attached to a vehicle. Practical applications for long-wheelbase trailers may include an ability to tow larger masses utilizing smaller vehicles without compromising one or more stability characteristics. Stability characteristics or the dynamics between a vehicle and a long-wheelbase trailer towed by the vehicle are among the factors to consider when designing or operating a vehicle connected to, attached to, or towing a trailer (e.g., a vehicle-trailer system). A yaw stability of a vehicle towing a long-wheel based trailer (e.g., trailer) is generally considerably lower than a yaw stability of the vehicle by itself. For example, a vehicle coupled with a trailer generally demonstrates or exhibits a reduced damping ratio of yaw dynamics, which may progressively worsen as the velocity of the vehicle-trailer system increases.

A vehicle with a trailer in tow may have different or additional modes of instability than merely a vehicle without a trailer attached. For example, jackknifing between the vehicle and the trailer may occur, such as when the trailer swings about a hitch connecting the vehicle and the trailer. Explained another way, when there is a large amount of relative yaw motion between the vehicle and the trailer, jackknifing may occur. As another example, instability may occur as a result of oscillation, such as lateral oscillation, or as a result of snaking, which is oscillation of the trailer when high velocities are reached. In yet another example, instability may occur as a result of a phase lag or a phase difference between characteristics of the vehicle and the trailer, such as a phase lag between the vehicle motion and the trailer motion caused by a distance separating the two (e.g., a separation distance). Yet another cause of instability may include rearward amplification (RWA) between a vehicle and a trailer. Rearward amplification is an increased lateral acceleration at a center of gravity (CG) of a trailer to that a center of gravity of a vehicle or a lead vehicle attached to the trailer operating one or more maneuvers or dynamic maneuvers.

Regardless, instability or unstable motion, such as excessive yaw motion or undesired yaw motion associated with a vehicle or a trailer is generally not desired. Further, instability or unstable motion may be exacerbated for a vehicle when a trailer is attached to the vehicle and a vehicle-trailer system is formed. When a trailer is attached or coupled to a vehicle, a lower yaw stability margin or unstable dynamics may result from attachment of the trailer.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

According to one or more aspects, a system for stability control is provided, including a sensor component, a predictive component, and a control component. The sensor component may receive one or more vehicle characteristics of a vehicle of a vehicle-trailer system, one or more trailer characteristics of a trailer of the vehicle-trailer system, or one or more steering inputs for the vehicle. The predictive component may determine a prediction based on yaw rate deviation for the vehicle or hitch rate oscillation of a hitch. Yaw rate deviation for the vehicle may be determined from one or more of the vehicle characteristics, one or more of the trailer characteristics, or one or more of the steering inputs. Hitch rate oscillation of a hitch coupling the vehicle to the trailer may be determined from one or more of the vehicle characteristics, one or more of the trailer characteristics, or one or more of the steering inputs. The prediction may be indicative of a likelihood of instability for the vehicle-trailer system, the vehicle, or the trailer.

The control component may generate one or more control actions based on the prediction and hitch rate feedback. The control component may generate one or more control actions based on the prediction and lateral hitch force feedback. The sensor component may calculate a hitch rate of the hitch of the vehicle-trailer system. Lateral hitch force feedback may be received from the sensor component.

According to one or more aspects, a method for stability control is provided, including receiving one or more vehicle characteristics of a vehicle of a vehicle-trailer system, one or more trailer characteristics of a trailer of the vehicle-trailer system, or one or more steering inputs for the vehicle, determining a prediction based on yaw rate deviation for the vehicle determined from one or more of the vehicle characteristics, one or more of the trailer characteristics, or one or more of the steering inputs or hitch rate oscillation of a hitch coupling the vehicle to the trailer determined from one or more of the vehicle characteristics, one or more of the trailer characteristics, or one or more of the steering inputs, where the prediction may be indicative of a likelihood of instability for the vehicle-trailer system, and generating one or more control actions based on the prediction and hitch rate feedback from the hitch of the vehicle-trailer system or lateral hitch force feedback.

According to one or more aspects, a system for stability control is provided, including a sensor component, a predictive component, a control component, and an actuation component. The sensor component may receive one or more vehicle characteristics of a vehicle of a vehicle-trailer system, one or more trailer characteristics of a trailer of the vehicle-trailer system, or one or more steering inputs for the vehicle. The predictive component may determine a prediction based on yaw rate deviation or hitch rate oscillation. The predictive component may determine yaw rate deviation for the vehicle based on one or more of the vehicle characteristics, one or more of the trailer characteristics, or one or more of the steering inputs.

The predictive component may determine hitch rate oscillation of a hitch coupling the vehicle to the trailer based on one or more of the vehicle characteristics, one or more of the trailer characteristics, or one or more of the steering inputs. The prediction may be indicative of a likelihood of instability for the vehicle-trailer system. The control component may generate one or more control actions based on the prediction and hitch rate feedback or lateral hitch force feedback. The sensor component may calculate a hitch rate of the hitch of the vehicle-trailer system. The lateral hitch force feedback may be received from the sensor component. The actuation component may implement one or more of the control actions via one or more steering actuators or one or more braking actuators.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DETAILED DESCRIPTION

Figure 1:
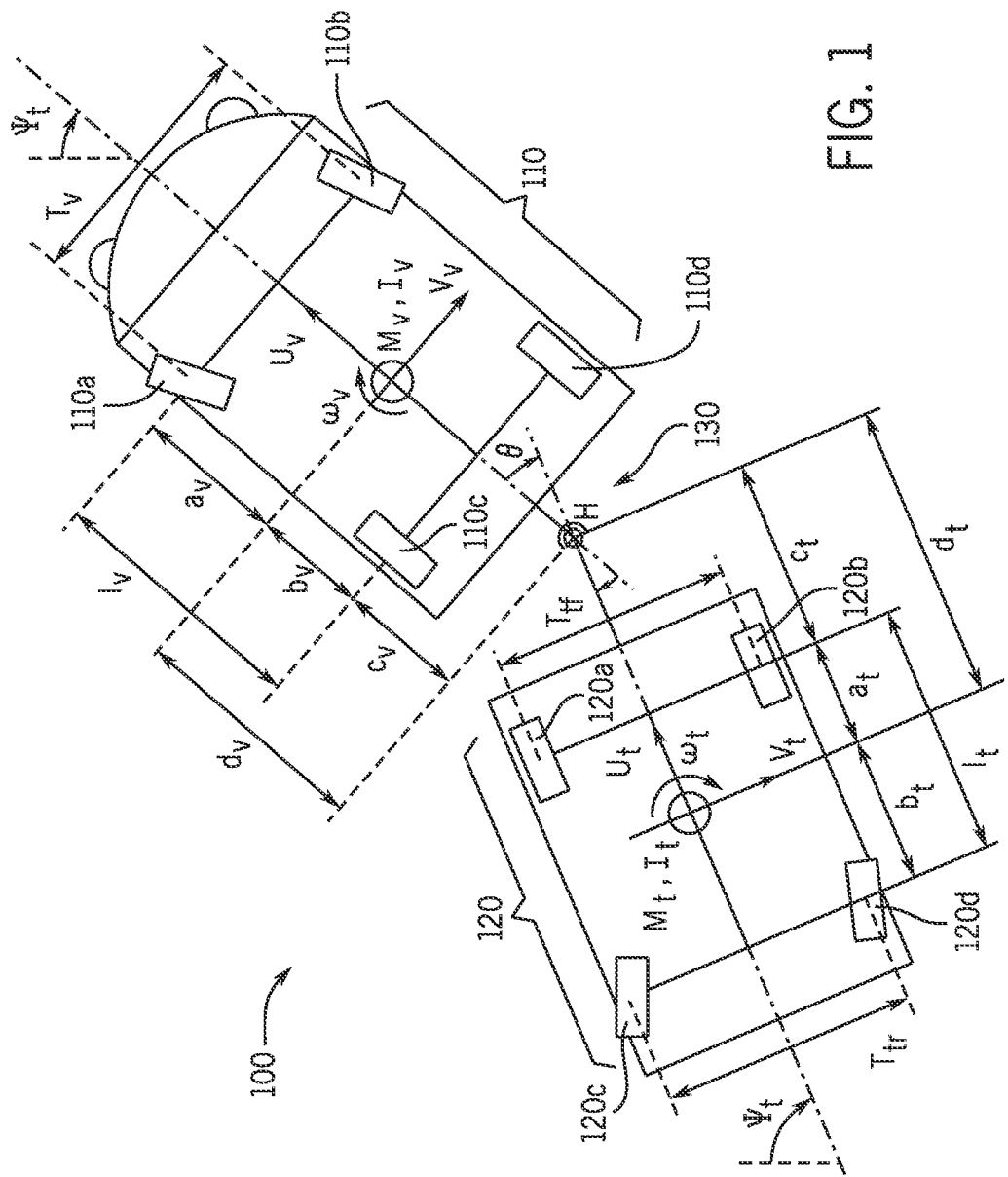
FIG. 1 is an illustration of an example vehicle-trailer system, according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Figure 12:
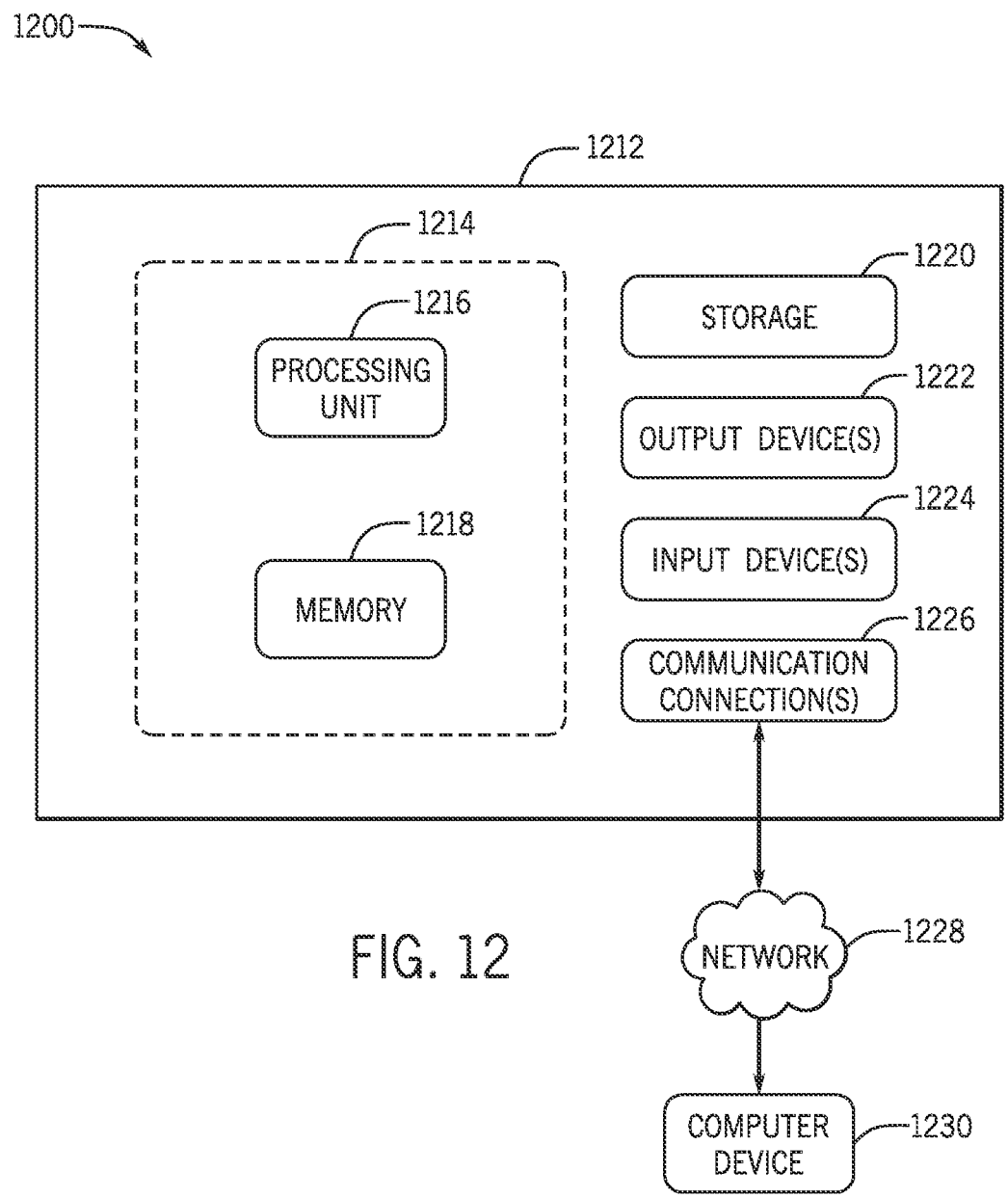
FIG. 12 is an illustration of an example computing environment where one or more of the provisions set forth herein are implemented, according to one or more embodiments.

For one or more of the figures herein, one or more boundaries, such as boundary 1214 of FIG. 12, for example, may be drawn with different heights, widths, perimeters, aspect ratios, shapes, etc. relative to one another merely for illustrative purposes, and are not necessarily drawn to scale. For example, because dashed or dotted lines may be used to represent different boundaries, if the dashed and dotted lines were drawn on top of one another they would not be distinguishable in the figures, and thus may be drawn with different dimensions or slightly apart from one another, in one or more of the figures, so that they are distinguishable from one another. As another example, where a boundary is associated with an irregular shape, the boundary, such as a box drawn with a dashed line, dotted lined, etc., does not necessarily encompass an entire component in one or more instances. Conversely, a drawn box does not necessarily encompass merely an associated component, in one or more instances, but may encompass a portion of one or more other components as well.

The following terms are used throughout the disclosure, the definitions of which are provided herein to assist in understanding one or more aspects of the disclosure.

As used herein, a vehicle may refer merely to a vehicle of a vehicle-trailer system or to a vehicle coupled to a trailer (e.g., a vehicle-trailer system or a vehicle trailer model). In other words, in some scenarios, a vehicle may include a trailer of a vehicle-trailer system.

As used herein, vehicle characteristics or trailer characteristics may be measured, received (e.g., as a steering input), or calculated from one or more measured characteristics.

As used herein, a critical velocity may be a velocity at which oscillations in a hitch angle between a vehicle and a trailer of a vehicle-trailer system continues to grow (e.g., unless control actions or corrective actions are taken to reduce or mitigate respective oscillations or the hitch angle).

As used herein, yaw or yaw motion may refer to rotational movement about a yaw axis, which passes vertically through a center of gravity (CG) of an object (e.g., trailer, vehicle, vehicle-trailer system, etc.). As used herein, a yaw rate may be an angular velocity around a yaw axis, such as a center of gravity of a vehicle or trailer, for example. As used herein, a yaw moment may be a torque about a yaw axis for an object, such as a vehicle or a trailer.

As used herein, a hitch rate of a vehicle-trailer system may be a difference between a yaw rate of a vehicle and a yaw rate of a trailer. In other words, a hitch rate may be defined as the vehicle yaw rate—the trailer yaw rate. As used herein, a hitch angle acceleration or hitch acceleration may be a rate of change for the hitch rate of the vehicle-trailer system.

As used herein, a slip angle may be an angle between a heading of a vehicle (or vehicle-trailer system) and an actual movement direction of the vehicle.

As used herein, damping ratio may be a measure of how oscillations, such as trailer oscillations, decay or dampen over time. Generally, as a damping ratio approaches 1, the greater the damping effect for a given system.

As used herein, a control action may be an output or a response provided by a system or method for stability control. Examples of control actions may include braking control actions, steering control actions, symmetric braking, differential braking, asymmetric braking, trailer steering, implementation of a symmetric braking scheme, implementation of a differential braking scheme, implementation of an asymmetric braking scheme, etc.

As used herein, a friction circle may be a representation of a maximum force a tire of a vehicle is capable of generating in any direction. For example, a diameter of a friction circle may represent a maximum horizontal force which a tire can generate.

As used herein, a cornering force may be a force parallel to a road surface produced by a tire of a vehicle during cornering (e.g., turning).

Referring now to the drawings, wherein the showings are for purposes of illustrating one or more exemplary embodiments and not for purposes of limiting the same, FIG. 1 is an illustration of an example vehicle-trailer system 100, according to one or more embodiments. The vehicle-trailer system 100 may include a vehicle 110 towing a trailer 120. The vehicle 110 may be coupled to the trailer 120 via a hitch (H) 130. The vehicle 110 may have one or more wheels or tires, such as tires 110a (driver-side front), 110b (passenger-side front), 110c (driver-side rear), and 110d (passenger-side rear). Although FIG. 1 illustrates a vehicle 110 with four tires and a trailer 120 with four tires, other embodiments may include additional or fewer tires for the vehicle 110 or the trailer 120, respectively. Similarly, the trailer 120 may have one or more wheels or tires, such as tires 120a (driver-side front), 120b (passenger-side front), 120c (driver-side rear), and 120d (passenger-side rear). As used herein, the following includes a list of variables or parameters and a corresponding description:

$a_v$: Longitudinal distance from vehicle center of mass to front axle
$b_v$: Longitudinal distance from vehicle center of mass to rear axle
$c_v$: Longitudinal distance from vehicle rear axle to hitch
$l_v$: Vehicle wheelbase
$d_v$: Longitudinal distance from vehicle center of mass to hitch
$T_v$: Vehicle trackwidth
$a_t$: Longitudinal distance from trailer center of mass to front axle
$b_t$: Longitudinal distance from trailer center of mass to rear axle
$c_t$: Longitudinal distance from trailer front axle to hitch
$l_t$: Trailer wheelbase
$d_t$: Longitudinal distance from trailer center of mass to hitch
$T_{tf}$: Trailer front trackwidth
$T_{tr}$: Trailer rear trackwidth
$\psi_v$: Vehicle global yaw angle
$\omega_v$: Vehicle yaw rate
$\theta$: Hitch angle
$\psi_t$: Trailer global yaw angle
$\omega_t$: Trailer yaw rate
$(U_v, V_v)$: Vehicle center of mass velocity components [body-fixed]
$(U_t, V_t)$: Trailer center of mass velocity components [body-fixed]
$M_v$: Vehicle mass
$M_t$: Trailer mass
$I_v$: Vehicle yaw moment of inertia about center of mass
$I_t$: Trailer yaw moment of inertia about center of mass
$\delta_v$: Vehicle steering angle [front]
$\delta_t$: Trailer steering angle [rear]

Figure 2:
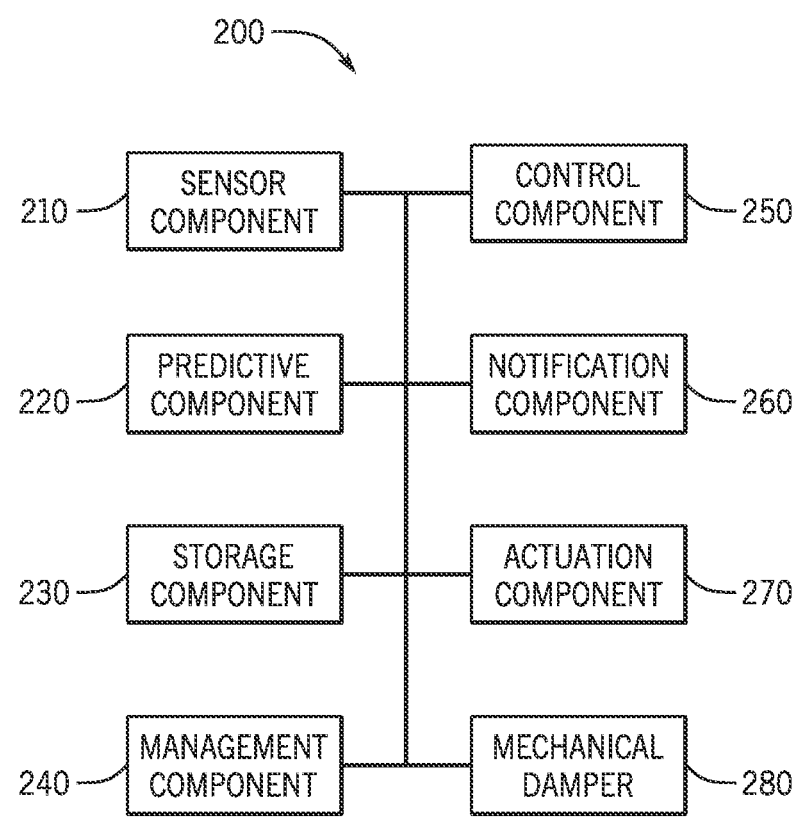
FIG. 2 is an illustration of an example component diagram of a system for stability control, according to one or more embodiments.

Referring now to FIG. 2, an illustration of an example component diagram of a system 200 for stability control, according to one or more embodiments is shown. The system 200 may include a sensor component 210, a predictive component 220, a storage component 230, a management component 240, a control component 250, a notification component 260, an actuation component 270, and a mechanical damper 280.

The sensor component 210 may include one or more sensors detecting, calculating, or receiving one or more vehicle characteristics, one or more trailer characteristics, one or more hitch characteristics, one or more vehicle-system characteristics, one or more measured characteristics, one or more steering inputs (e.g., steering angle), etc. Examples of sensors may include a yaw rate sensor, a velocity sensor or velocity receiver, position sensors, gyroscopic sensors, etc. Examples of vehicle characteristics, trailer characteristics, hitch characteristics, vehicle-trailer system characteristics, measured characteristics, etc. may include velocity, yaw, yaw motion, yaw rate, yaw moment, hitch rate, hitch angle, hitch tension, lateral hitch force, hitch angle response, damping ratio, cornering force, braking force, etc.

The sensor component 210 may calculate a characteristic, such as a hitch rate based on one or more of the measured characteristics (e.g., a vehicle yaw rate and a trailer yaw rate). As another example, the sensor component 210 may calculate a yaw rate deviation for a vehicle or vehicle-trailer system based on measured characteristics (e.g., velocity of a vehicle, measured yaw rate, etc.) and steering inputs (e.g., steering angle) for the vehicle or vehicle-trailer system. Regardless, the sensor component 210 may calculate one or more of the vehicle characteristics or one or more of the trailer characteristics based on one or more of the measured characteristics or one or more of the steering inputs.

The predictive component 220 may calculate, determine, or generate one or more predictions or one or more jackknife predictions based on yaw rate deviation or hitch rate oscillation of a vehicle-trailer system. As an illustrative example, the predictive component 220 may generate one or more predictions regarding a likelihood of jackknifing between a trailer and a vehicle of a vehicle-trailer system by estimating a vehicle state, estimating a trailer state, calculating a first order approximation to determine an evolution of the state of the vehicle or the state of the trailer, and determining a risk based on an estimated time left before accident (TLBA).

In one or more embodiments, the predictive component 220 may generate a jackknifing prediction or prediction based on yaw rate deviation between a desired yaw rate and an actual yaw rate of a vehicle, a trailer, or a vehicle-trailer system. In other words, the predictive component 220 may utilize yaw rate deviation to estimate or predict jackknifing between a vehicle and a trailer of a vehicle-trailer system. For example, the predictive component 220 may compare the desired yaw rate with the actual yaw rate of a vehicle. The predictive component 220 may generate a prediction associated with jackknifing based on a difference greater than a yaw rate deviation threshold or a yaw rate safety threshold, such as a predetermined yaw rate deviation threshold, for example. The actual yaw rate may be measured or calculated by the sensor component 210. Additionally, the velocity of the vehicle and the steering angle of the vehicle may be detected by the sensor component 210.

In one or more embodiments, the desired yaw rate or nominal yaw rate may be calculated for a vehicle, trailer, or vehicle-trailer system by the predictive component 220. For example, the desired yaw rate of a vehicle may be calculated based on a model, such as a linear model or a linear bicycle model. Again, the predictive component 220 may compare the desired yaw rate with the actual yaw rate of the vehicle. During stable or near-ideal driving conditions or situations, an actual yaw rate of a vehicle may be similar or within a close tolerance of a desired yaw rate of the vehicle.

Because a driver may not be able to discern non-linear yaw characteristics under nominal driving conditions, utilization of a linear model enables the predictive component 220 to provide a reasonable representation of what the driver may wish to accomplish (e.g., a desired yaw rate). An actual yaw motion or yaw rate of a vehicle-trailer system may be related to a steering wheel angle exerted from a driver and the speed or velocity of the vehicle or vehicle-trailer system. In one or more embodiments, the predictive component 220 may calculate a desired yaw rate or a nominal yaw rate for a vehicle or a vehicle-trailer system based on one or more steering inputs, such as a measured steering angle or velocity of a vehicle or a vehicle-trailer system, and a linear model, such as a linear bicycle model.

As an example, discrepancies between a desired yaw rate of a vehicle and an actual yaw rate of a vehicle may arise or increase when large slip angles develop at one or more tires on the vehicle (or trailer). When these large slip angles develop, this may result in the vehicle deviating from a desired course or otherwise cause a deviation in the desired yaw rate from the actual yaw rate. For a vehicle on its own, a discrepancy between a desired yaw rate and actual yaw rate may be characterized as oversteer and understeer. Oversteer occurs when an actual yaw rate is greater than a desired yaw rate (e.g., indicated or determined based on one or more steering inputs, such as steering angle). Understeer occurs when an actual yaw rate is less than a desired yaw rate.

When a trailer is attached to, connected to, or coupled with a vehicle (e.g., thereby forming a vehicle-trailer system), the predictive component 220 may calculate or determine a desired yaw rate based on a linear vehicle model. In other words, computation of a desired yaw rate mapping may be based on one or more steering inputs, such as steering angle and velocity.

Figure 3:
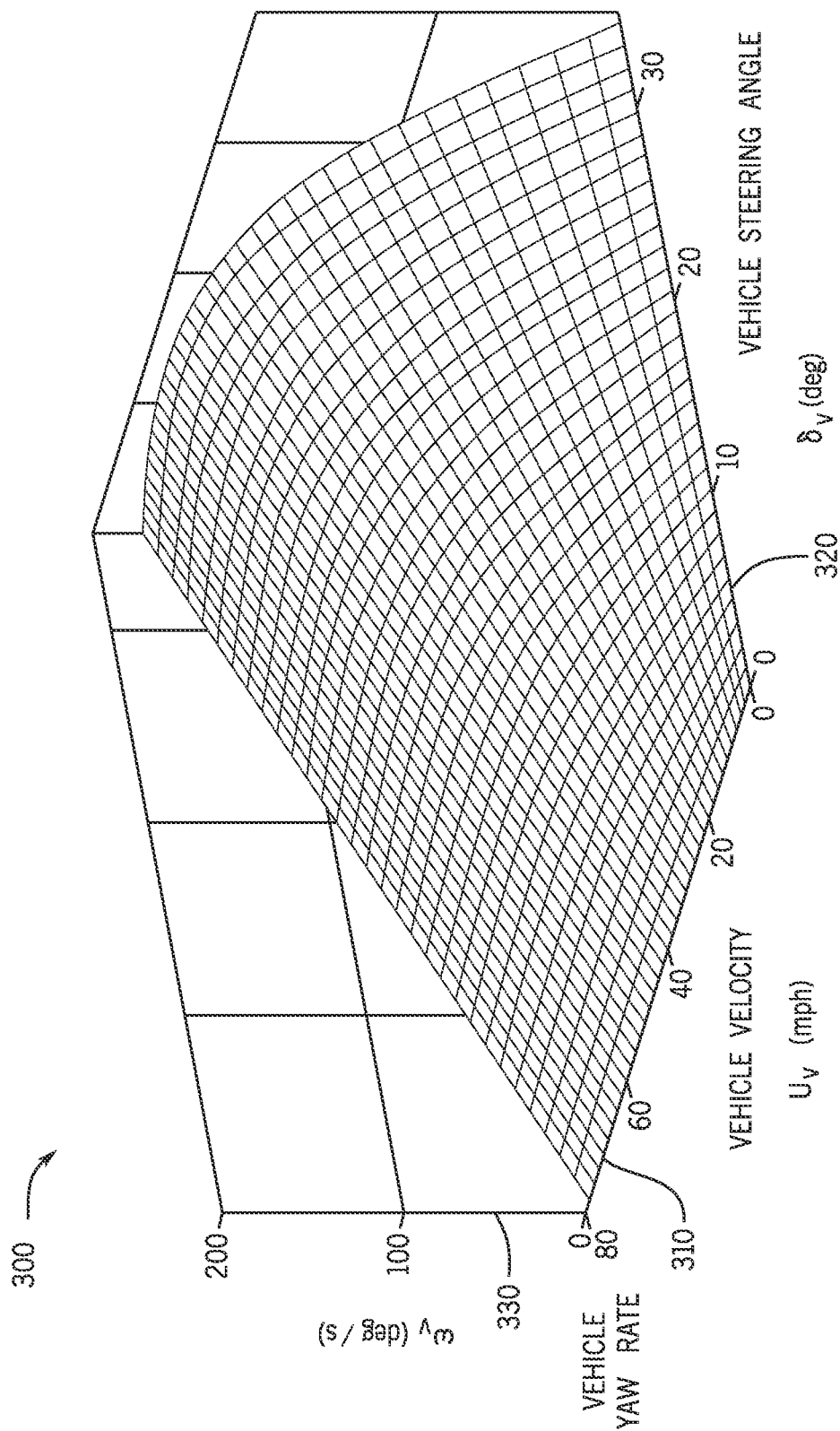
FIG. 3 is an illustration of an example graphical representation of a yaw rate lookup table, according to one or more embodiments.

In one or more embodiments, the predictive component 220 may utilize a lookup table (e.g., a predetermined lookup table) to determine a desired yaw rate based on a velocity of a vehicle and a steering angle of the vehicle. For example, an exemplary graphical representation of a lookup table is provided in FIG. 3. FIG. 3 is an illustration of an example graphical representation 300 of a yaw rate lookup table, according to one or more embodiments. In FIG. 3, it can be seen that a desired yaw rate may be determined at 330, provided that a velocity 310 and a steering angle 320 are given. Effectively, FIG. 3 is a graphical representation of an example lookup table for a desired yaw rate (e.g., along axis 330) for a vehicle based on the velocity of the vehicle (e.g., along axis 310) and the steering angle of the vehicle (e.g., along axis 320).

Referring back to FIG. 2, the predictive component 220 may determine a deviation or difference between a desired yaw rate and a measured yaw rate or an actual yaw rate or otherwise utilize yaw rate deviation to enable, disable, activate, or trigger stability control via the control component 250. The predictive component 220 may thus engage stability control based on yaw rate deviation. For example, a signal may be sent to the control component 250 to activate stability control based on an error or a deviation (e.g., yaw rate deviation) greater than a yaw rate deviation threshold. In this way, stability control may be activated by the predictive component 220 when a difference greater than a threshold difference (e.g., or absolute value thereof) between a desired yaw rate and an actual or measured yaw rate is determined or found.

Additionally, a maximum yaw rate limit for a coupled system or vehicle-trailer system may be considered. Under assumptions of small side slip and steady state turning, the lateral acceleration may be approximated as a product of the vehicle velocity and the yaw rate ($A_y = -\omega_v \cdot U_v$). Since the steady state lateral acceleration may not be increased beyond frictional limits, the desired yaw rate from the above equation may be governed by the following relationship(s):

$$|\omega_{v,desired}| \leq \left|\mu \cdot \frac{g}{U_v}\right| \quad (1)$$

or:

$$|\omega_{v,desired}| \leq \left|\frac{A_{y,measured}}{U_v}\right| \quad (2)$$

In one or more embodiments, the predictive component 220 may transmit or send a signal to the notification component 260 to have the notification component 260 warn or notify a driver of a vehicle based on an actual yaw rate or measured yaw rate greater than a yaw rate safety threshold. In other words, the predictive component 220 may have the notification component 260 warn a driver when the vehicle is turning faster than a predetermined threshold yaw rate (e.g., the yaw rate safety threshold).

In other embodiments, the predictive component 220 may transmit a signal to the notification component 260 based on a difference between the actual yaw rate and the desired yaw rate. In other words, the predictive component 220 may have the notification component 260 warn a driver when a vehicle is turning faster than expected (e.g., greater than a yaw rate deviation threshold). As will be discussed herein, one or more control actions, such as braking or steering, may be applied in response to excessive yaw rate deviation (e.g., when a yaw rate deviation between a desired yaw rate and an actual yaw rate which exceeds a pre-determined threshold).

In one or more embodiments, the predictive component 220 may utilize hitch rate oscillation to estimate or predict jackknifing between a vehicle and a trailer for a vehicle-trailer system. In other words, the predictive component 220 may generate a jackknifing prediction or prediction based on a hitch rate signal of a vehicle-trailer system. The hitch rate signal may be utilized to facilitate such predictions because if yaw oscillations or hitch rate oscillations are present in a hitch due to snaking, the oscillatory behavior on a trailer of a vehicle-trailer system may grow over time, thereby causing instability if left uncontrolled. Accordingly, detection of these yaw oscillations (e.g., via the hitch rate signal) or snaking may be utilized by the predictive component 220 to generate one or more predictions or one or more jackknife predictions.

As discussed, the hitch rate is a difference between a vehicle yaw rate and a trailer yaw rate. In other words, a hitch rate represents the yaw rate difference between the trailer and the vehicle ($\dot{\theta} = \omega_t - \omega_v$). Therefore, when $\omega_t \neq \omega_v$, $\dot{\theta}$ or the hitch rate is a nonzero value and the hitch angle is changing, thereby contributing to instability of the vehicle-trailer system. The predictive component 220 may thus utilize the hitch rate, a hitch rate signal, or hitch rate oscillation to determine or predict jackknifing for a vehicle-trailer system.

During a transient state or a transient situation, it may be useful to determine whether a final hitch angle rate converges to zero (e.g., without providing one or more control actions). In a hitch angle-hitch rate phase plane, a region which represents stability of a vehicle-trailer system may vary according to or based on a velocity of the vehicle-trailer system. When trailer oscillations are present, a resulting trajectory in this hitch angle-hitch rate phase plane may be circular. Since the radius of such circular trajectories may increase as oscillations grow, the rate of change for the hitch rate (e.g., hitch angle acceleration) may increase as well. In other words, hitch angle acceleration may increase when trailer oscillations increase.

Accordingly, the predictive component 220 may utilize oscillation frequency and hitch angle acceleration (e.g., from a hitch rate signal) to determine hitch rate oscillation. The hitch rate signal may be received or calculated by the sensor component 210. When oscillation is present, a hitch rate signal may be a sine wave signal due to the changing of the hitch rate or oscillation between the trailer and the vehicle. Because sine waves, such as a hitch rate signal associated with oscillation, have zero-crossing points, a wave duration counter may be initialized when the hitch rate signals crosses a zero line, as indicated below:

$$flag_{zero-crossing} = \frac{\text{sgn}(\theta(n)) - \text{sgn}(\theta(n-5))}{2} \quad (3)$$

In other words, the wave duration counter may be utilized to measure the wavelength of a hitch rate signal, thereby enabling the predictive component 220 to determine a hitch rate oscillation wavelength.

Figure 4:
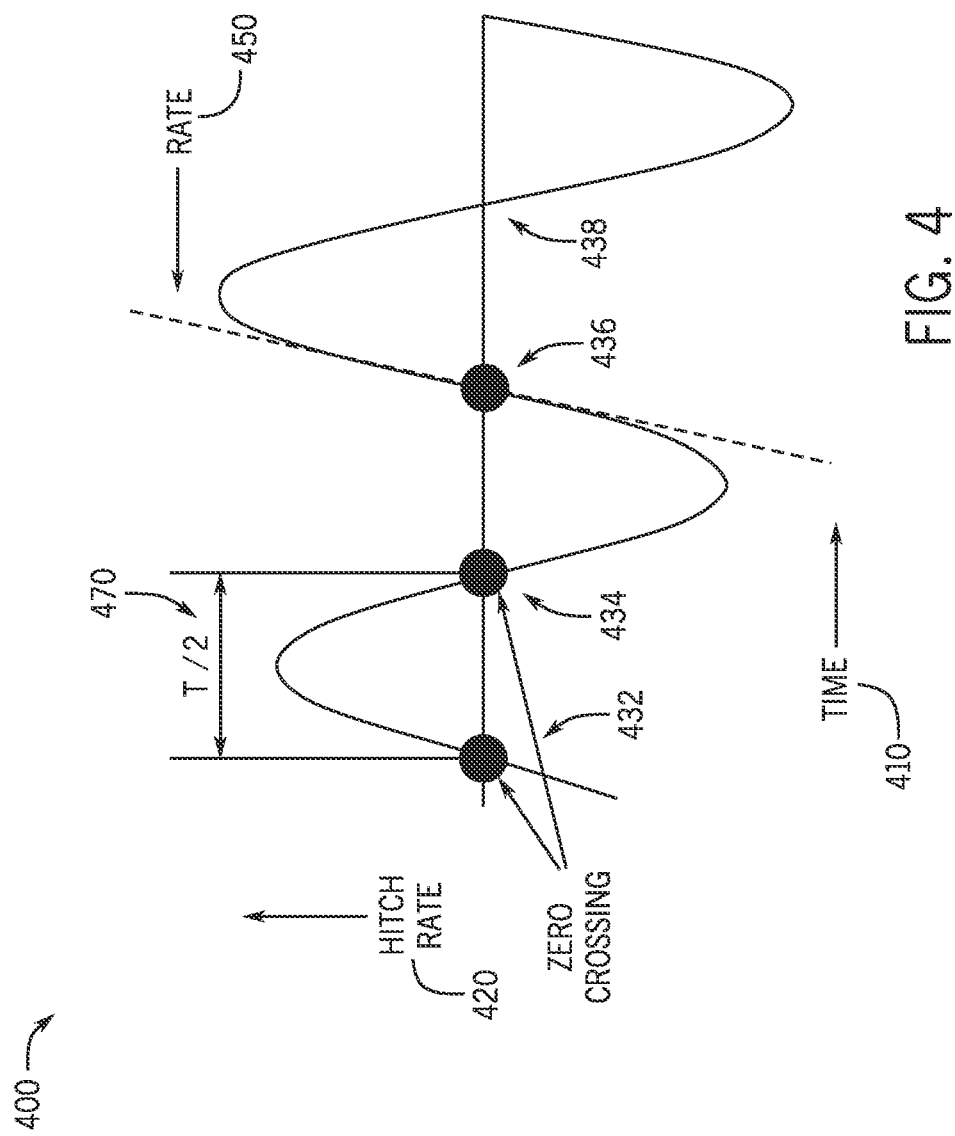
FIG. 4 is an illustration of an example graphical representation of a hitch rate signal, according to one or more embodiments.

FIG. 4 is an illustration of an example graphical representation 400 of a hitch rate signal, according to one or more embodiments. In FIG. 4, measurement of an exemplary hitch rate oscillation wavelength (e.g., T/2 470) and an exemplary hitch acceleration for an exemplary hitch rate signal are illustrated in accordance with one or more embodiments. The graphical representation 400 of FIG. 4 illustrates a hitch rate signal on a hitch rate 420 versus time 410 axis. In this example, the sampling time for measurement of the hitch rate signal may be 10 milliseconds. In one or more embodiments, sign checking for zero-crossing detection may be performed at one or more time intervals, such as at 50 millisecond time intervals. In this way, the sign checking may mitigate one or more false-positives which may occur as a result of sensor noise, for example.

Accordingly, it can be seen that equation [3] includes a (n−5) term which accounts for 5 samples at 10 millisecond time intervals. When a zero-crossing is detected, oscillation frequency or a hitch rate oscillation wavelength and hitch acceleration may be calculated. For example, in FIG. 4, a period may be calculated based on a period of time between a first zero-crossing 432 and a second zero-crossing 434. Here, in this example, the period of time between the first zero-crossing 432 and the second 434 or subsequent zero-crossing may be a half-period (e.g., T/2 470). Therefore a full period "T" may be calculated by multiplying the time between the first zero-crossing 432 and the second zero-crossing 434 by 2.

Referring again to FIG. 2, the sensor component 210 may receive a hitch rate signal, detect one or more zero crossings for the hitch rate signal at one or more corresponding times and calculate an oscillation frequency, oscillation wavelength, hitch angle acceleration, etc. for the hitch rate signal. The predictive component 220 may calculate a hitch rate oscillation wavelength or oscillation frequency based on two or more of the zero crossings and corresponding times. For example, the predictive component 220 may take a difference between two subsequent, succeeding, or consecutive zero crossing times, such as the difference between a second zero-crossing time 434 and a first zero-crossing time 432.

The predictive component 220 may utilize a frequency response of a $\omega_v/\delta_v$ transfer function to determine whether a corresponding frequency is indicative of the onset of instability (e.g., or whether there is a likelihood of jackknifing). It can be seen that the resonant frequency in the $\omega_v/\delta_v$ response is also the same resonant frequency for $\theta/\delta_v$. Accordingly, the predictive component 220 may set one or more oscillation detection criteria to generate a prediction of instability if oscillations near or on the resonant frequency are measured from the hitch rate signal. In one or more embodiments, the predictive component 220 may predict jackknifing between a vehicle and a trailer of a vehicle-trailer system based on the $\omega_v/\delta_v$ transfer function or a resonant frequency thereof. Accordingly, the predictive component 220 may determine a jackknifing prediction or prediction based on a yaw rate of the vehicle, a steering angle of the vehicle, a related transfer function, or a related resonant frequency.

In any event, the peak amplitude of the hitch acceleration in the oscillation or the rate 450 (e.g., slope) of a hitch rate during a zero-crossing 436 may be estimated, as illustrated in FIG. 4. Measurements of hitch acceleration through different cycles of the hitch rate signal and analysis of one or more of the measurements (e.g., hitch rate oscillation wavelength, hitch acceleration, one or more zero-crossings (e.g., 432, 434, 436, 438, etc.), one or more corresponding zero-crossing times, etc.) may enable the predictive component 220 to determine whether a hitch rate signal converges or diverges. In other words, the sensor component 210 may receive the hitch rate signal and the predictive component 220 may analyze one or more aspects (e.g., period, wavelength, or slope) of the hitch rate signal.

This analysis enables the predictive component 220 to determine if a hitch rate signal is becoming unstable (e.g., diverging or having an increasing oscillation, magnitude, or amplitude) or if the hitch rate signal is damping (e.g., converging or having a decreasing oscillation, magnitude, or amplitude). For example, if the hitch acceleration is increasing over one or more oscillation cycles of the hitch rate signal, the predictive component 220 may determine that the hitch rate signal is indicative of unstable behavior (e.g., possibility of jackknifing). Accordingly, the control component 250 may utilize this prediction to suggest one or more control actions (e.g., control actions which increase hitch damping in closed-loop motion, etc.).

The storage component 230 may house or store one or more thresholds, such as yaw rate deviation threshold, yaw rate safety threshold, one or more predetermined thresholds, time left before accident (TLBA) thresholds, "jackknife" thresholds, activation thresholds, hitch angle thresholds, etc.

In one or more embodiments, the management component 240 may activate stability control or the control component 250 of a system for stability control based on a prediction from the predictive component 220 (e.g., indicative of instability, jackknifing, or a likelihood of instability for the vehicle-trailer system, the vehicle, or the trailer). The management component 240 may activate stability control or a have a control component 250 engage in stability control based on yaw rate deviation (e.g., an error or difference between an actual yaw rate and a desired yaw rate which is greater than a yaw rate deviation threshold) or hitch rate oscillation of a hitch rate signal.

Generally, the hitch rate should be reduced when stability is desired. However, at lower speeds (e.g., a velocity below a low speed maneuverability cutoff threshold), maneuverability may be desired. Accordingly, the management component 240 may disable stability control or control actions for a vehicle-trailer system based on a low speed maneuverability cutoff threshold. For example, at low speeds or low velocities below the low speed maneuverability cutoff threshold, stability control, such as braking control actions may not be necessary (e.g., to stabilize a trailer of a vehicle-trailer system)

and may thus be disabled to enhance maneuverability at those low speeds or low velocities. In other words, braking control actions may be disabled at speeds or velocities below the low speed maneuverability cutoff threshold. In this way, when control actions, such as braking control actions, are disabled at low speeds, greater maneuverability may be achieved for a vehicle-trailer system.

At high speeds (e.g., velocities greater than a high speed steering cutoff threshold), the management component 240 may disable one or more aspects of stability control, such as one or more steering control actions for a trailer. In this way, the management component 240 may enable or disable stability control based on a velocity of a vehicle or a velocity of a vehicle-trailer system.

The management component 240 may activate stability control based on a time left before accident (TLBA) threshold or a threshold for activation based on a minimum TLBA, which may be calculated by the predictive component 220.

The control component 250 may determine one or more control actions for one or more actuators (e.g., actuation component 270) based on feedback from a vehicle-trailer system. The control component 250 may include one or more brake controllers, one or more steering controllers, one or more ABS controllers, or a combination thereof. For example, the control component 250 may utilize hitch rate feedback or lateral hitch force feedback to determine one or more of the control actions. With regard to hitch rate feedback, the control component 250 may implement hitch rate feedback control to provide one or more control actions, which mitigate or minimize the hitch rate. In other words, the sensor component 210 may monitor the hitch rate and the control component 250 may provide one or more control actions which, when implemented, reduce the amount or magnitude of the hitch rate detected by the sensor component 210. Explained another way, the control component 250 may monitor a hitch rate of a vehicle-trailer system and determine one or more control actions based on the hitch rate.

For example, an activation threshold may be set in a $\theta$-$\dot{\theta}$ phase plane to detect one or more jackknife conditions or predictions associated with a vehicle-trailer system. Accordingly, the control component 250 may apply one or more control actions, such as one or more braking actions or one or more steering actions to mitigate instability or potential jackknifing. The control component 250 may apply braking control actions or steering control actions proportional to a distance beyond a stable threshold (e.g., an activation threshold).

Figure 5:
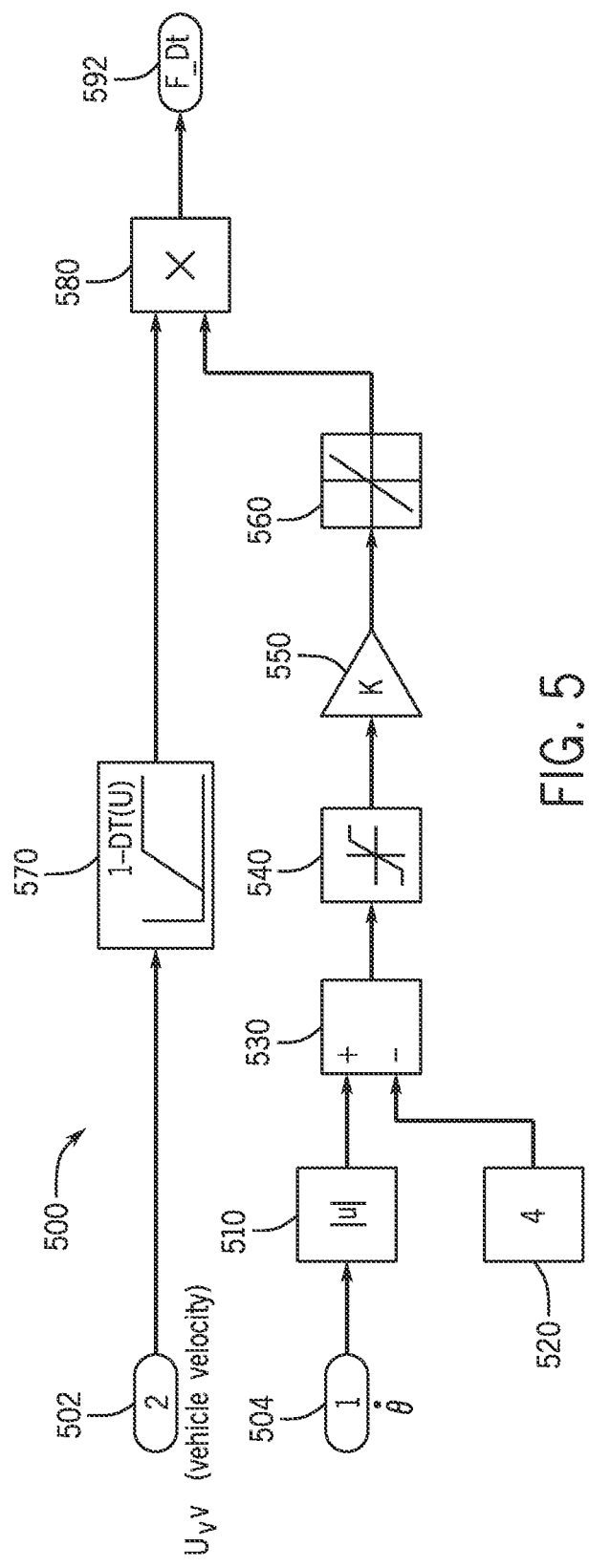
FIG. 5 is an illustration of an example component diagram of a control component of a system for stability control, according to one or more embodiments.

FIG. 5 is an illustration of an example component diagram of a control component 500 of a system for stability control, according to one or more embodiments. The control component 500 of FIG. 5 may be similar to control component 250 of FIG. 2. Regardless, the control component 500 of FIG. 5 may provide stability control for a vehicle-trailer system by controlling the hitch rate (e.g., utilizing a hitch rate limitation approach). For example, inputs 502 and 504 may be provided for the control component 500. Here, in this example, the velocity of the vehicle 502 and the hitch rate 504 may be inputs. A low speed maneuverability cutoff component 570 may disable stability control or the control component 500 based on a vehicle velocity below a low speed maneuverability cutoff threshold, as seen at 580. At 510, the absolute value of the hitch rate 504 may be determined. At 530, a difference between a hitch rate threshold 520 and the hitch rate 510 (or absolute value thereof) may be determined. At 540, 550, and 560, positive, anti-swing brake gain, and slew rate limiting may be applied, respectively. At 592, a control action may be provided based on the low speed maneuverability cutoff component 570 and the output of the slew rate limit component 560.

In one or more embodiments, an activation threshold and a control gain are tunable based on customizable preferences or user preferences, such as desired handling or one or more conservativeness characteristics. Utilizing the hitch rate limitation approach, the control component 250 may drive a steady state configuration of a vehicle-trailer system to minimize the hitch rate when possible. In other words, because the desired hitch rate or $\dot{\theta}_{desired}$=0, the control component 250 may determine one or more control actions which, when implemented, may drive the oscillation rate or hitch rate of a vehicle-trailer system down or otherwise reduce the hitch rate.

A benefit of using hitch rate feedback is that because the hitch angle and hitch rate are relative quantities between vehicle and trailer, the steady state desired value is zero. Therefore, the reference desired hitch rate is zero with upper and lower bound for acceptable values in transient motion. While hitch rate limitation or reduction is desirable, the hitch angle may articulate freely based on coupled trailer motion to facilitate turning. For example, because non-zero hitch angles may be desirable under cornering, the hitch angle may be permitted to change.

In one or more embodiments, the control component 250 may utilize lateral hitch force feedback to provide stability control to a vehicle-trailer system. Generally, when a trailer of a vehicle-trailer system is under cornering and no steering is applied to the trailer, the trailer may tend to continue in a straight line. When the vehicle pulls the trailer (under cornering), a trailer yaw motion may result from the vehicle exerting a force on the hitch. In response, the trailer may exert an equal and opposite lateral force on the hitch, thereby generating a destabilizing moment for the trailer. In other words, when a vehicle of a vehicle-trailer system engages in a maneuver, such as turning, the trailer may generate a moment which increases yaw propensity or a destabilizing moment.

Figure 6:
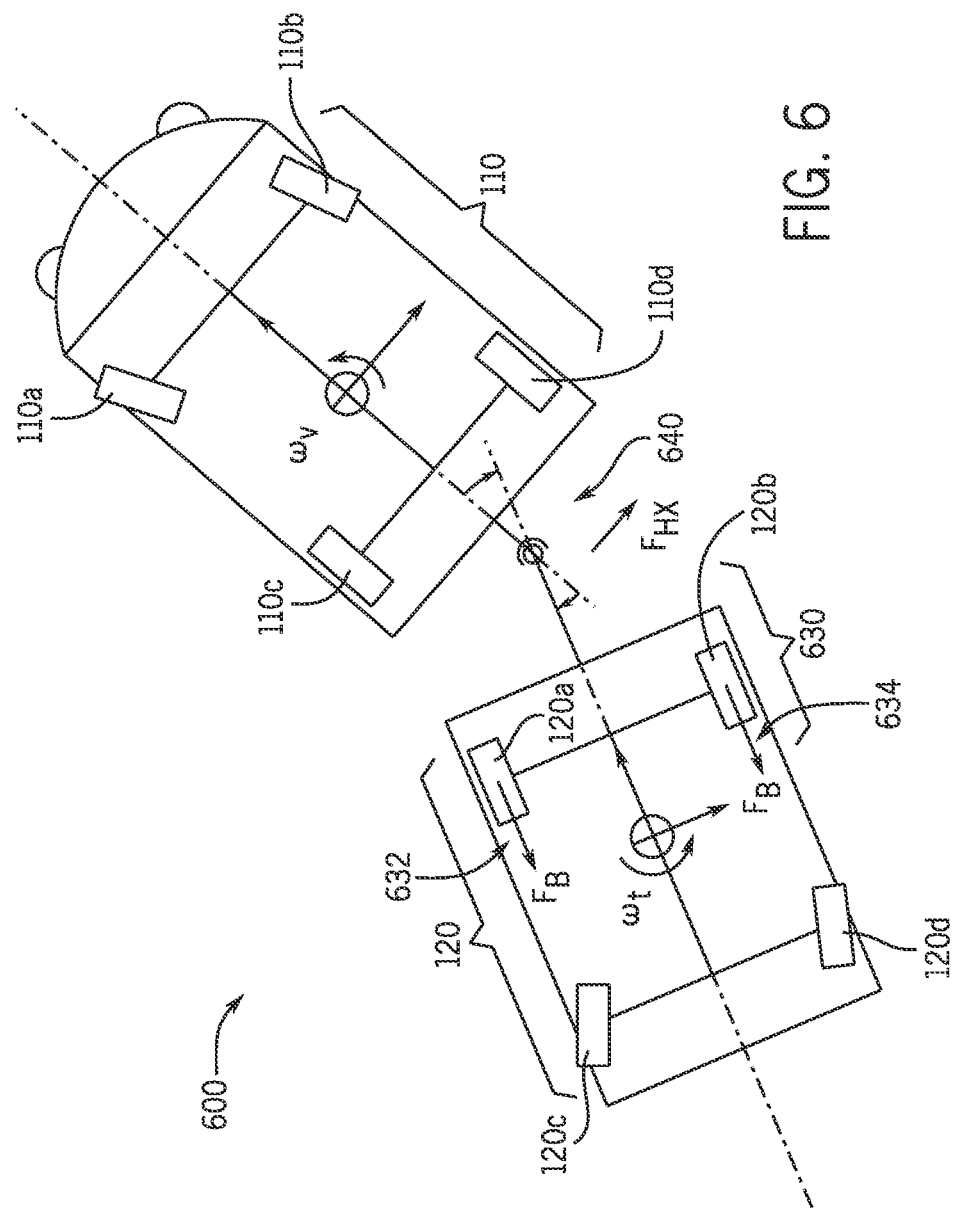
FIG. 6 is an illustration of an example implementation of a symmetric braking scheme on a vehicle-trailer system, according to one or more embodiments.

In FIG. 6, a lateral hitch force in the vehicle body frame $F_{Hx}$ may cause an increase in the vehicle yaw rate (e.g., an oversteer or potential oversteer) or increased lateral tire forces to compensate for additional yaw moment introduced by the lateral hitch force $F_{Hx}$. This increased lateral tire force may come from increased slip angles, increasing tire wear and pushing system dynamics of the vehicle-trailer system closer to the friction circle.

Referring again to FIG. 2, in one or more embodiments, the control component 250 may implement lateral hitch force feedback control to provide one or more control actions for a trailer of a vehicle-trailer system. In other words, the control component 250 may monitor a lateral hitch force and determine one or more control actions based on the lateral hitch force. Explained yet another way, the control component 250 may utilize lateral hitch force feedback to determine one or more control actions, such as braking control actions or steering control actions, on a trailer of a vehicle-trailer system to reduce or mitigate a lateral hitch force. In this way, a stabilizing moment may be increased, for example. Stated another way, the control component 250 may monitor the lateral hitch force and determine one or more control actions (e.g., braking control actions) which, when implemented, may reduce the lateral hitch force and increase hitch tension. When the lateral hitch force is reduced, a destabilizing moment applied on a vehicle from a trailer of a vehicle-trailer system may be reduced, thereby mitigating the likelihood of jackknifing or a propensity of jackknifing.

Regardless of the type of feedback used, the control component 250 may provide one or more control actions for a trailer of a vehicle-trailer system in response to stability control being activated (e.g., via a management component 240). For example, one or more of the control actions may include braking of one or more tires of a trailer. Different types of braking may be applied by the control component 250. In one or more embodiments, differential braking or a differential braking scheme may be applied to one or more tires of a trailer. In other embodiments, symmetrical braking or a symmetrical braking scheme may be applied to one or more tires of a trailer. Regardless, these control actions (e.g., for the trailer of a vehicle-trailer system) may mitigate jackknifing or unstable behavior.

The control component 250 may provide an actuation component 270 with one or more control actions, such as braking control actions or steering control actions. The control component 250 may provide one or more braking control actions which reduce a longitudinal velocity of the vehicle-trailer system, thereby resulting in a higher damping ratio and greater stability characteristics. Additionally, one or more of the braking control actions may facilitate providing feedback to a driver or operator of a vehicle-trailer system, thereby alerting the driver to slow down. In other words, the automatic braking providing by the control component 250 may alert a driver of a vehicle or cause the driver to notice a change in operation of the vehicle. In this way, the control component 250 may mitigate operation of a vehicle-trailer system in a manner associated with excessive speeding.

Because the damping ratio for a hitch angle generally decreases with increasing velocity (e.g., eventually crossing a critical velocity where damping of hitch oscillations is zero or no damping occurs), the control component 250 may apply a closed loop response of a hitch angle to increase the damping ratio. By applying a closed loop response of the hitch angle to a vehicle-trailer system, the damping ratio may be increased, thereby pushing a critical velocity of the vehicle-trailer system higher, which enables stable operation of the vehicle-trailer system within a greater operation range or operation envelope.

Generally, when a vehicle-trailer system undergoes a backing up motion or when a velocity of the trailer is greater than a velocity of the vehicle, the vehicle pushes the trailer or exerts a rearward force on the trailer. This force is a compressive hitch force, which may induce a destabilizing yaw moment on the trailer, which is generally undesirable. Conversely, when a vehicle-trailer system moves forward, the vehicle generally pulls the trailer, and thus the hitch angle is self stabilizing (e.g., with zero steering angles, the system generally stabilizes to a zero hitch angle). One or more of the control actions or one or more of the braking schemes provided by the control component 250 may thus create similar stabilizing effects.

In one or more embodiments, the control component 250 may provide one or more control actions, such as braking control actions associated with a symmetrical braking scheme for a trailer. For example, FIG. 6 is an illustration of an example implementation 600 of a symmetric braking scheme on two or more tires a vehicle-trailer system, according to one or more embodiments. Here, in FIG. 6, the symmetric braking 630 of a pair of wheels or tires 120a and 120b (e.g., front passenger and front driver tires at 632 and 634, respectively) sharing a same axle may result in creation of a hitch tension 640, thereby generating a stabilizing moment for the trailer 120. In this way, the symmetric braking implemented by the control component 250 of a system for stability control may straighten or reduce a hitch angle between a vehicle 110 and a trailer 120 of a vehicle-trailer system.

Further, the control component 250 may control one or more brakes of the trailer or provide one or more control actions to control corresponding brakes such that a cornering force combined with a braking force does not exceed a corresponding friction circle (as will be described herein). As a result of such control actions (e.g., controlling trailer brakes such that the combined cornering and braking forces do not exceed the friction circle), symmetric braking may reduce a relative difference between vehicle yaw motion and trailer yaw motion. As seen in FIG. 6, the vehicle has a counter-clockwise yaw rate $\omega_v$, and similarly, the trailer also has a counter-clockwise yaw rate $\omega_t$. When a control component 250 of a system for stability control implements a symmetric braking scheme, this may reduce a difference between the two yaw rates (e.g., vehicle yaw rate and trailer yaw rate), thereby mitigating jackknifing. Here, in FIG. 6, wheels or tires 120a and 120b of a front axle of a trailer may provide a symmetric braking force in response to one or more control actions provided by the control component 250 to an actuation component 270. The symmetric braking may cause a stabilizing moment to be generated for the trailer and result in a trailer yaw rate $\omega_t$ of the trailer.

In one or more embodiments, the control component 250 may provide one or more control actions, such as braking control actions associated with a differential braking scheme for a trailer. For example, the control component 250 may calculate one or more braking actions which, when implemented via the actuation component 270, may create a hitch tension and a yaw moment which reduces a relative difference between a vehicle yaw rate and a trailer yaw rate (e.g., reduce a hitch rate).

Figure 7:
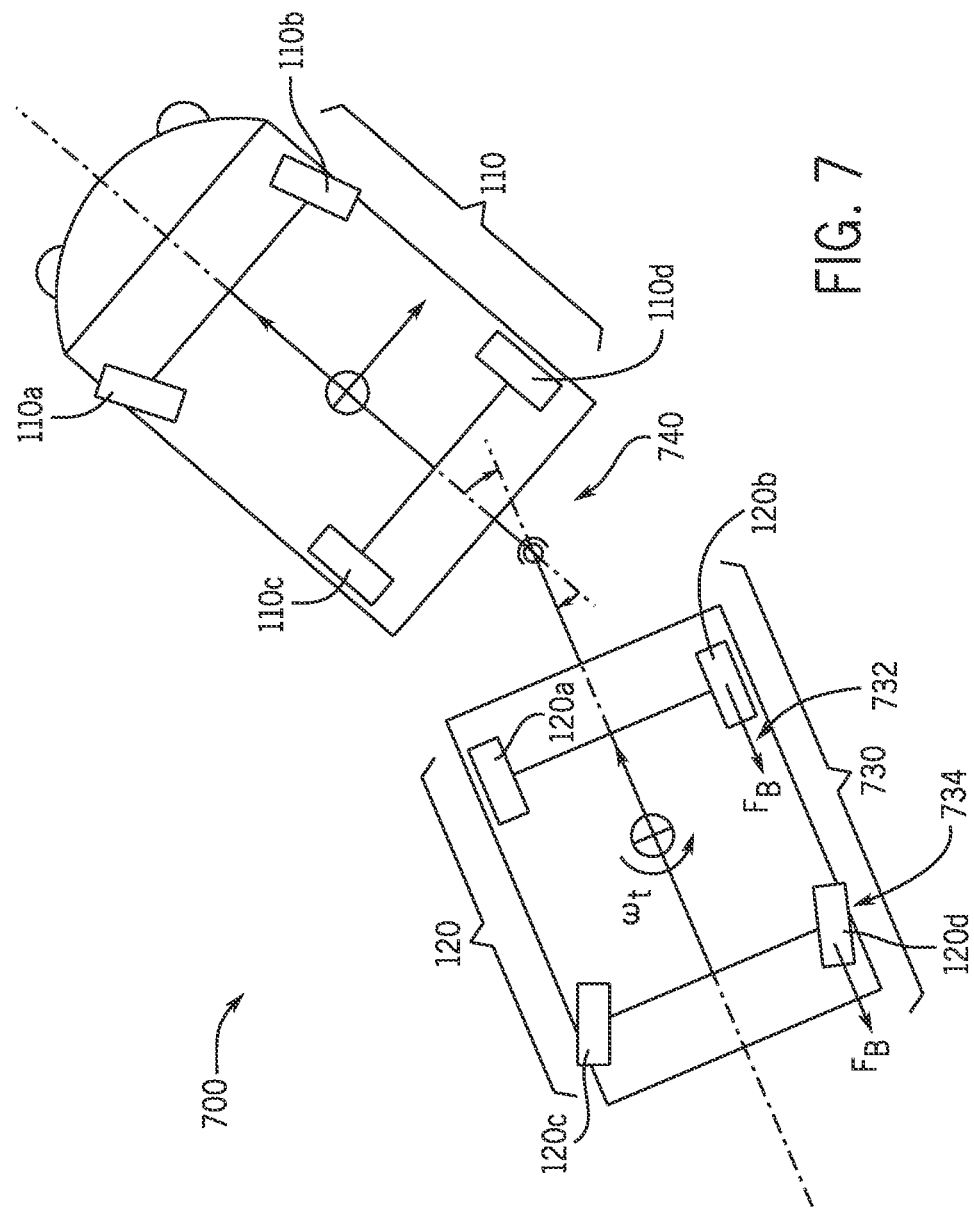
FIG. 7 is an illustration of an example implementation of a symmetric braking scheme on a vehicle-trailer system, according to one or more embodiments.

In one or more embodiments, the control component 250 determines a magnitude for differential braking or asymmetric braking based on an estimated reduction in lateral cornering forces. In this way, the control component 250 may mitigate wheel or tire lockup. FIG. 7 is an illustration of an example implementation 700 of an asymmetric braking scheme on a vehicle-trailer system, according to one or more embodiments. Here, in FIG. 7, the control component 250 may implement differential braking or asymmetric braking on a right side of a trailer for tires 120b and 120d (e.g., passenger front and passenger rear tires 732 and 734, respectively). An asymmetric braking force $F_B$ 730 may be applied on a right side of the trailer 120 such that a counter-clockwise or negative yaw moment is applied on the trailer 120, thereby reducing a hitch angle 740 between the trailer 120 and the vehicle 110. In this example, because the vehicle 110 is turning left, the control component 250 may determine one or more control actions associated with differential braking or asymmetric braking for a right side or passenger side of the trailer 120.

Conversely, if the vehicle 110 is turning left, the control component 250 may determine one or more control actions associated with differential braking or asymmetric braking for a left side or driver side of the trailer 120 (e.g., tires 120a and 120c). In this way, the control component 250 may utilize differential braking to generate a stabilizing moment for a trailer 120 of a vehicle-trailer system. The control component 250 may determine a braking side for one or more of the control actions based on a sign (e.g., positive or negative) of a hitch angle 740 between the trailer 120 and the vehicle 110 and a desired yaw moment, a desired yaw rate or a desired direction of the yaw moment of the trailer 120.

Accordingly, the control component 250 may implement one or more of the braking control actions based on one or more determinations by the predictive component 220, oscillations within the trailer, oscillations associated with deviations in the hitch angle greater than a threshold angle, etc. In this way, the control component 250 may actively control hitch oscillation by modulating trailer yaw dynamics.

In one or more embodiments, the control component 250 may include an anti-lock braking system (ABS) controller (not shown). As an example, the control component 250 or the ABS controller may calculate or determine a friction circle associated with a trailer, a friction circle associated with the vehicle, or a friction circle associated with a vehicle-trailer system. The control component 250 or the ABS controller of the control component 250 may determine one or more of the control actions based on feedforward braking from the vehicle. In other words, the control component 250 may determine one or more control actions or braking control actions for a trailer of a vehicle-trailer system based on brakes being applied to the vehicle of the vehicle-trailer system.

Here, the control component 250 may utilize feedforward braking or the braking from the vehicle to determine a proportional brake pressure to be applied to wheels of the trailer to mitigate compressive forces on the hitch coupling the vehicle and the trailer while the vehicle is braking. Explained another way, when the vehicle is braking, a coupled trailer without one or more control actions or corrective actions applied may continue movement, thereby creating compressive force on the hitch, which may be undesirable. Symmetrical braking or differential braking may thus be implemented by the control component 250 to mitigate such compressive forces.

Figure 8:
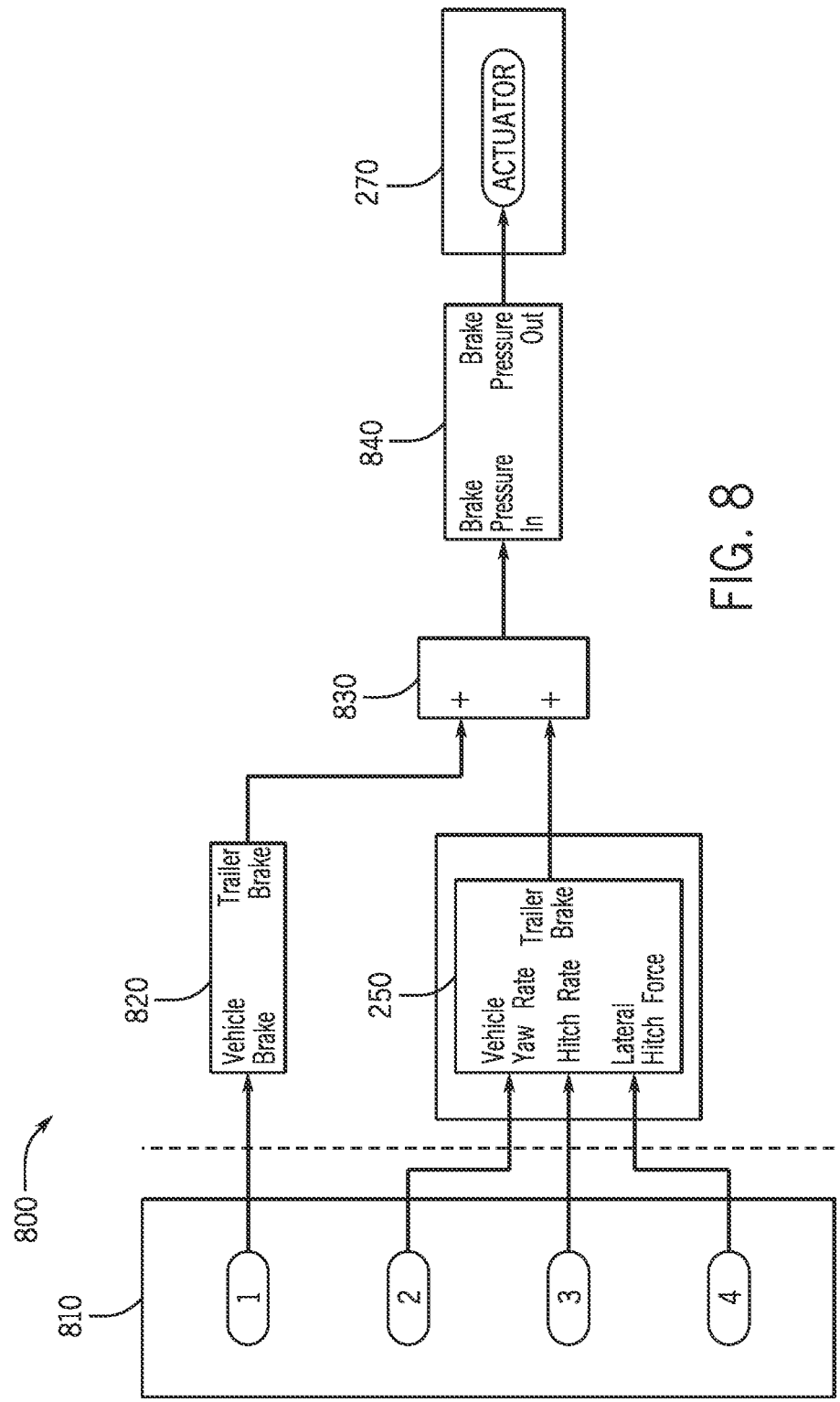
FIG. 8 is an illustration of an example component diagram of a system for stability control with an anti-lock braking (ABS) controller, according to one or more embodiments.

In one or more embodiments, the sensor component 210 may receive or obtain a signal associated with the brake pressure for the vehicle. In other embodiments, the sensor component 210 may include a vehicle mounted trailer brake controller which measures longitudinal deceleration of the vehicle. Regardless, brake pressure information or deceleration information may be transmitted or implemented in a feedforward configuration to the control component 250. A feedforward brake command (e.g., proportional to a vehicle brake command) may be combined or implemented along with one or more embodiments of trailer stability control, as seen in FIG. 8. FIG. 8 is an illustration of an example component diagram of a system 800 for stability control with an anti-lock braking (ABS) controller, according to one or more embodiments. This combined braking may be modulated through an anti-lock brake system controller or ABS controller 840, thereby mitigating lock-up or loss of traction.

Here, in FIG. 8, trailer brake pressure may be a combination 830 of feedforward braking and added braking force from a feedback stability controller or control component 250. For example, inputs 810 may include vehicle brake pressure information (1), a vehicle yaw rate (2), a hitch rate (3), and a lateral hitch force (4). A trailer brake controller 820 (e.g., may be a sub-component of control component 250) may receive the vehicle brake information and feedforward respective brake information to a trailer anti-lock braking system 840 via 830. A control component 250, such as the control component 250 of FIG. 2, may pass respective information via 830 to a trailer ABS controller 840 which determines a control action or braking control action for the trailer and passes the control action to an actuation component 270, such as a trailer brake actuator or trailer brake calipers, for example.

In one or more embodiments, the control component 250 may provide one or more control actions associated with trailer steering based on hitch rate feedback. These control actions may include trailer steering control actions (e.g., steering of tires of a trailer) to dampen a hitch angle response due to cornering at high velocities, for example. Further, one or more of the control actions associated with steering or trailer steering may increase a damping ratio, thereby reducing a chance of undesired oscillations caused by the hitch angle between the vehicle and trailer of a vehicle-trailer system.

In one or more embodiments, the control component 250 may provide one or more control actions associated with trailer steering based on lateral hitch force feedback. Respective trailer steering actions, when implemented, may adjust a steering angle of the trailer such that the lateral hitch force is minimized or reduced. By reducing one or more coupling forced associated with the lateral hitch force, slip angles on the vehicle and/or the trailer of a vehicle-trailer system may be reduced, thereby improving stability of the vehicle-trailer system.

In one or more embodiments, a vehicle steering angle may be fed forward to the control component 250 to determine a trailer steering angle. By utilizing feedforward trailer steering, such as during cornering, vehicle and trailer slip angles may be reduced, thereby increasing one or more stability characteristics of a vehicle-trailer system. In one or more embodiments, such as an embodiment illustrated in FIG. 9, the control component 250 may supply a component 950 an open loop steering angle from the vehicle to determine a desired trailer steering angle based on a no-slip curve component 940.

Figure 9:
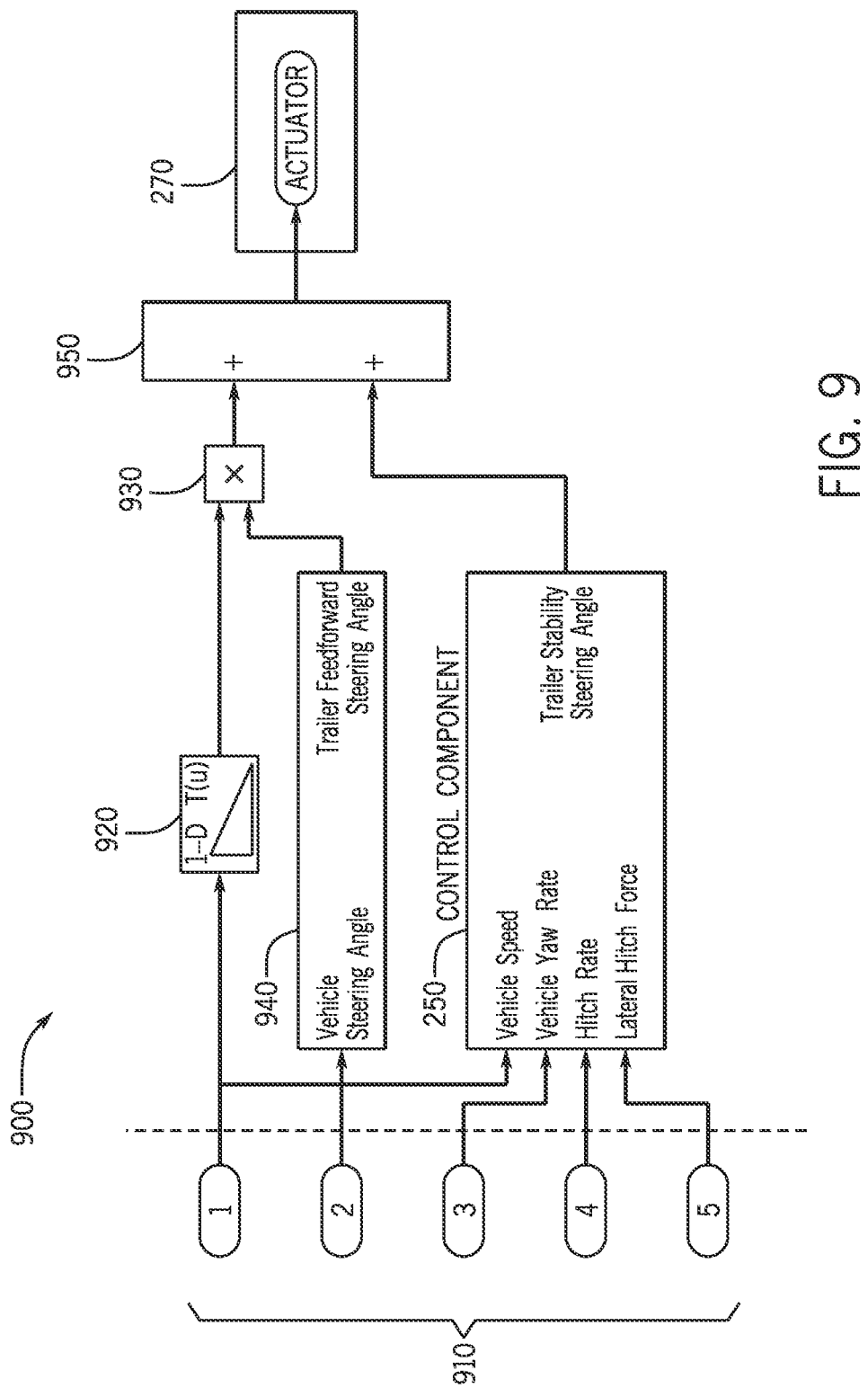
FIG. 9 is an illustration of an example component diagram of a system for stability control with feedforward, feedback, and high velocity cutoff, according to one or more embodiments.

FIG. 9 is an illustration of an example component diagram of a system 900 for stability control with feedforward, feedback, and high velocity cutoff, according to one or more embodiments. In FIG. 9, 910 may include one or more inputs for the system 900 for stability control. Respective inputs 910 may include vehicle velocity (1), vehicle steering angle (2), vehicle yaw rate (3), hitch rate (4), and lateral hitch force (5).

A high speed cutoff component 920 may mitigate a controller or a component (e.g., actuator 270) from applying steering beyond one or more actuator bandwidth operating ranges. For example, the vehicle velocity (1) may feed the high speed cutoff component 920, which may drive the steering at 930 (e.g., as indicated by the product including an output of 930). Accordingly, it can be seen that a velocity dependent cutoff component 920 is provided to mitigate oversteer or understeer due to system or component limitations at velocities greater than a system bandwidth, for example.

A vehicle steering angle may be fed forward to no-slip component 940 which may apply a no-slip curve. The vehicle speed or velocity, vehicle yaw rate, hitch rate, and lateral hitch force may be provided to the control component 250 which may determine a control action associated with trailer stability, such as a trailer steering control action. A sum of a trailer feedforward steering angle and a trailer stability steering angle may be determined at 950 if the high speed cutoff component 920 does not disable steering control actions. These control actions may be fed to the actuator 270.

Additionally, the control component 250 may implement feedback from the sensor component 210 (e.g., one or more measured characteristics, one or more steering inputs, etc.) to provide stability control. The feedforward component may improve open loop stability for a given velocity, while a feedback component of the control component 250 may provide active control with one or more control actions which maintain trailer stability during the presence of disturbances.

The control component 250 may include a damper controller which has a damper actuator enable damping of trailer oscillations via actuation of a hitch angle via a mechanical damper 280.

In one or more embodiments, the management component 240 may enable or disable stability control, such as one or more steering control actions, based on one or more system characteristics, such as bandwidth limitations on an actuator or actuation component 270 which may result in a phase difference between oscillation of a trailer and respective control actions or a lag in a response time for a component. In other words, the management component 240 may ensure that one or more control actions provided by a control component 250 may be implemented in a manner which promotes stability (e.g., implemented in phase). Accordingly, the management component 240 may have the sensor component 210 monitor a phase difference between oscillation of a trailer and one or more control actions provided by the control component 250 to determine whether respective oscillations and control actions are in phase, out of phase, becoming out of phase, etc.

In one or more embodiments, the management component 240 may disable stability control or one or more control actions associated with steering based on feedback from the sensor component 210. As an example, if oscillation of a trailer and one or more control actions associated with steering become out of phase, the management component 240 may disable one or more aspects of stability control associated with steering. Accordingly, the sensor component 210 may monitor for such phase differences between oscillation of the trailer and control actions.

If the management component 240 determines that one or more control actions are out of phase or becoming out of phase with respect to oscillations of the trailer, the management component 240 may provide the control component 250 with a signal, such as a shutdown signal which terminates one or more corresponding control actions. In other words, the management component 240 may monitor one or more control actions provided by the control component 250 and analyze respective control actions to determine whether they may have potential to cause additional instability or mitigate instability. Here, the management component 240 may mitigate instability by disabling one or more control actions which are out of phase with oscillations of a trailer.

In this way, the management component 240 may disable one or more aspects of stability control, such as one or more control actions associated with trailer steering or one or more steering control actions, for example. Accordingly, system characteristics, such as a bandwidth of an actuator or actuation component 270, response time of a system, or other limitations may be taken into account when implementing stability control.

The notification component 260 may provide one or more notifications to a driver of a vehicle when one or more thresholds are being exceeded, such as a yaw rate safety threshold provided by the storage component 230, for example. The notification component 260 may provide one or more visual notifications, audio notifications, etc. Further, the notification component 260 may provide one or more of the notifications in conjunction with one or more control actions. In other words, if the control component 250 determines one or more braking control actions to be implemented, the notification component 260 may provide one or more notifications prior to, during, or after execution or implementation of respective braking control actions.

The actuation component 270 may include one or more actuators, such as a brake actuator (not shown), a steering actuator (not shown), a damper actuator (not shown), etc. The brake actuator may operate brakes or brake calipers for one or more tires or one or more wheels of a vehicle or a trailer of a vehicle-trailer system. In one or more embodiments, a brake actuator may actuate one or more brakes for one or more corresponding tires or wheels of a trailer based on one or more control actions provided by the control component 250.

For example, with reference to FIG. 6 or FIG. 7, a brake actuator (not shown) of an actuation component (e.g., the actuation component 270 of FIG. 2) may initiate braking for one or more wheels or tires, such as wheels or tires 120a, 120b, 120c, or 120d of the trailer, individually, or according to a braking scheme, such as a differential braking scheme or a symmetrical braking scheme.

The steering actuator may steer one or more tires or one or more wheels of a vehicle or a trailer of a vehicle-trailer system.

The damper actuator may engage a mechanical damper 280 with one or more components of a vehicle-trailer system. A damper actuator may enable damping of trailer oscillations via direct actuation of a hitch angle via a mechanical damper 280. The damper actuator may be electrically activated, such as with a magnetorheological damper or electromechanically adjusted utilizing variable valves in a damper piston. In this way, varying levels of damping may be applied to a hitch angle based on an estimated risk of jackknifing.

Generally, at lower speeds or velocities, maneuverability may be desirable, and thus a lower damping coefficient may be utilized. As the speed or velocity of a vehicle-trailer system increases, a hitch angle damping ratio decreases. Accordingly, as the velocity of a vehicle-trailer system increases, the damper actuator may increase a damping coefficient to offset a decreased damping ratio of otherwise unactuated hitch rotation.

In one or more embodiments, the actuation component 270 may provide passive control of hitch motion or hitch rate control by applying mechanical damping to a hitch angle response of a vehicle-trailer system. In other words, the mechanical damper 280 is utilizes to reduce oscillations, hitch motion, or other forces at a hitch between a vehicle and a trailer.

Figure 10:
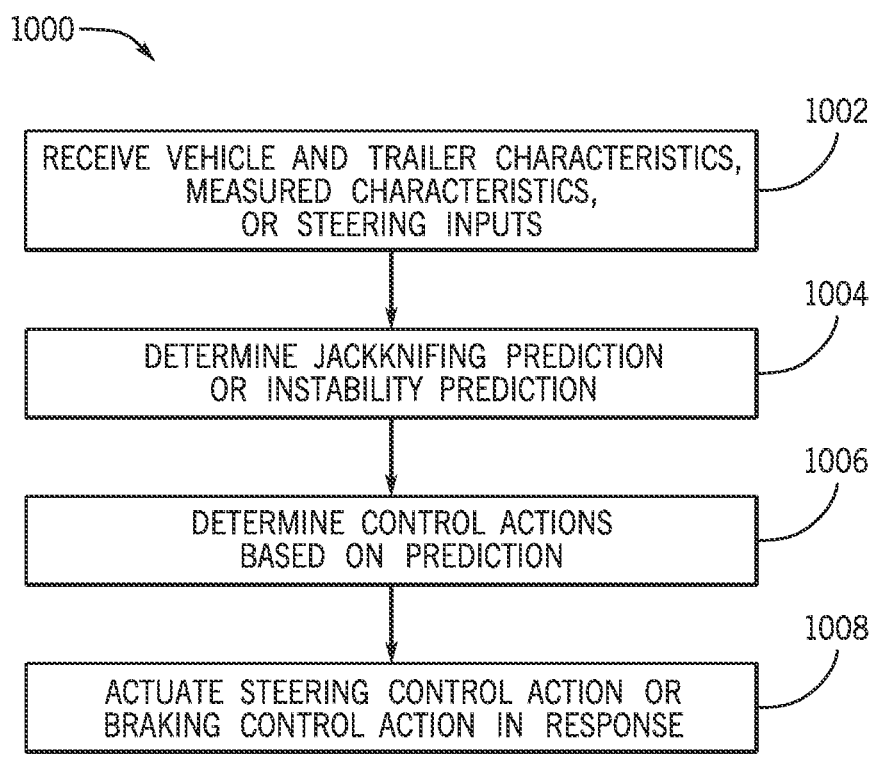
FIG. 10 is an illustration of an example flow diagram of a method for stability control, according to one or more embodiments.

FIG. 10 is an illustration of an example flow diagram of a method 1000 for stability control, according to one or more embodiments. At 1002, one or more vehicle characteristics, trailer characteristics, measured characteristics, or steering inputs may be received. At 1004, a jackknifing prediction, an instability prediction, or prediction may be generated or determined. At 1006, one or more control actions may be generated or determined based on respective predictions. At 1008, steering or braking control actions may be actuated in response.

Stability control may provide improvements in the technology of stability control by providing control actions which mitigate jackknifing and other instability characteristics, thereby mitigating occurrence of accidents and instability of vehicle-trailer systems. The technical field of trailer steering and stability control may thus be provided with systems and techniques for mitigating jackknifing, trailer swing, and trailer oscillation, thereby providing stability for drivers of vehicles with trailers in tow. This may be achieved by determining predictions associated with trailer instability and taking corrective action, such as control actions which implement one or more braking schemes, such as a differential braking scheme or a symmetric braking scheme. Implementation of these control actions may create a hitch tension and a stabilizing yaw moment, thereby reducing a relative difference between a vehicle yaw rate (or yaw motion thereof) and a trailer yaw rate (e.g., the hitch rate). Further, hitch angle response may be dampened and longitudinal velocity reduced, thereby increasing a damping ratio, which results in higher stability characteristics for the vehicle-trailer system while mitigating undesirable oscillations in a hitch angle between the vehicle and the trailer.

Figure 11:
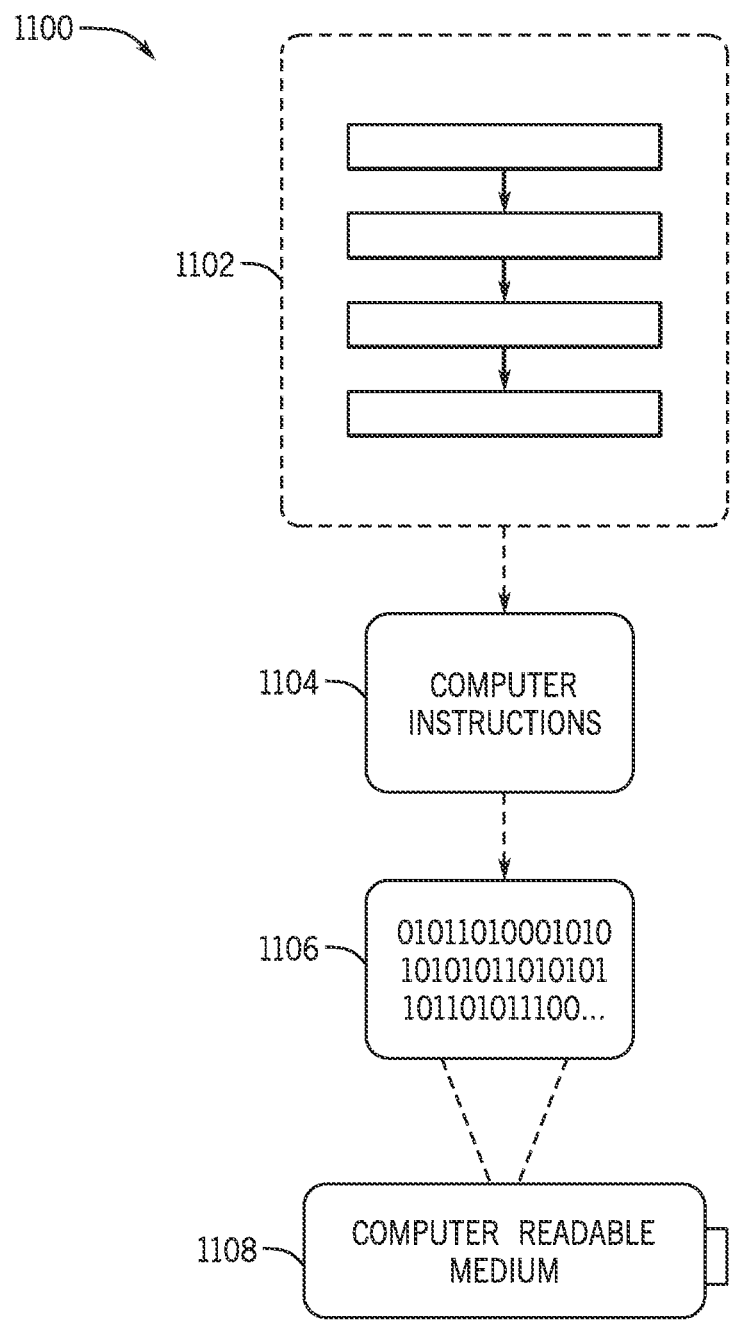
FIG. 11 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 11, wherein an implementation 1100 includes a computer-readable medium 1108, such as a CD-R, DVD-R, flash drive, a platter of a hard disk drive, etc., on which is encoded computer-readable data 1106. This computer-readable data 1106, such as binary data including a plurality of zero's and one's as shown in 1106, in turn includes a set of computer instructions 1104 configured to operate according to one or more of the principles set forth herein. In one such embodiment 1100, the processor-executable computer instructions 1104 may be configured to perform a method 1102, such as the method 1000 of FIG. 10. In another embodiment, the processor-executable instructions 1104 may be configured to implement a system, such as the system 200 of FIG. 2 or other systems described herein. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 12 and the following discussion provide a description of a suitable computing environment to implement embodiments of one or more of the provisions set forth herein. The operating environment of FIG. 12 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 12 illustrates a system 1200 including a computing device 1212 configured to implement one or more embodiments provided herein. In one configuration, computing device 1212 includes at least one processing unit 1216 and memory 1218. Depending on the exact configuration and type of computing device, memory 1218 may be volatile, such as RAM, non-volatile, such as ROM, flash memory, etc., or a combination of the two. This configuration is illustrated in FIG. 12 by dashed line 1214.

In other embodiments, device 1212 includes additional features or functionality. For example, device 1212 may include additional storage such as removable storage or non-removable storage, including, but not limited to, magnetic storage, optical storage, etc. Such additional storage is illustrated in FIG. 12 by storage 1220. In one or more embodiments, computer readable instructions to implement one or more embodiments provided herein are in storage 1220. Storage 1220 may store other computer readable instructions to implement an operating system, an application program, etc. Computer readable instructions may be loaded in memory 1218 for execution by processing unit 1216, for example.

The term "computer readable media" as used herein includes computer storage media. Computer storage media includes volatile and nonvolatile, removable and non-removable media implemented in any method or technology for storage of information such as computer readable instructions or other data. Memory 1218 and storage 1220 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 1212. Any such computer storage media is part of device 1212.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 1212 includes input device(s) 1224 such as keyboard, mouse, pen, voice input device, touch input device, infrared cameras, video input devices, or any other input device. Output device(s) 1222 such as one or more displays, speakers, printers, or any other output device may be included with device 1212. Input device(s) 1224 and output device(s) 1222 may be connected to device 1212 via a wired connection, wireless connection, or any combination thereof. In one or more embodiments, an input device or an output device from another computing device may be used as input device(s) 1224 or output device(s) 1222 for computing device 1212. Device 1212 may include communication connection(s) 1226 to facilitate communications with one or more other devices 1230, such as via a network 1228.

According to one or more aspects, a system for stability control is provided, including a sensor component, a predictive component, and a control component. The sensor component may receive one or more vehicle characteristics of a vehicle of a vehicle-trailer system, one or more trailer characteristics of a trailer of the vehicle-trailer system, or one or more steering inputs for the vehicle. The predictive component may determine a prediction based on yaw rate deviation for the vehicle or hitch rate oscillation of a hitch. Yaw rate deviation for the vehicle may be determined from one or more of the vehicle characteristics, one or more of the trailer characteristics, or one or more of the steering inputs. Hitch rate oscillation of a hitch coupling the vehicle to the trailer may be determined from one or more of the vehicle characteristics, one or more of the trailer characteristics, or one or more of the steering inputs. The prediction may be indicative of a likelihood of instability for the vehicle-trailer system, the vehicle, or the trailer.

The control component may generate one or more control actions based on the prediction and hitch rate feedback. The control component may generate one or more control actions based on the prediction and lateral hitch force feedback. The sensor component may calculate a hitch rate of the hitch of the vehicle-trailer system. Lateral hitch force feedback may be received from the sensor component.

In one or more embodiments, one or more of the control actions may include implementation of a differential braking scheme, a symmetrical braking scheme, or trailer steering control actions. The system may include a management component enabling or disabling stability control or one or more control actions based on a velocity of the vehicle and a low speed maneuverability cutoff threshold. The system may include a storage component storing the low speed maneuverability cutoff threshold. The system may include an actuation component actuating one or more steering actuators or one or more braking actuators based on one or more of the control actions.

The predictive component may determine yaw rate deviation based on a desired yaw rate and an actual yaw rate, wherein the actual yaw rate is measured by the sensor component. The desired yaw rate may be determined based on a lookup table using a velocity of the vehicle and a steering angle of the vehicle as inputs for the lookup table. The predictive component may determine hitch rate oscillation of the hitch based on a yaw rate of the vehicle, a steering angle of the vehicle, or an associated transfer function. The control component may include a trailer steering controller generating one or more trailer steering control actions based on feedforward of a steering angle of the vehicle. The system may include a management component enabling or disabling stability control or one or more of the trailer steering control actions based on a velocity of the vehicle and a high speed steering cutoff threshold.

According to one or more aspects, a method for stability control is provided, including receiving one or more vehicle characteristics of a vehicle of a vehicle-trailer system, one or more trailer characteristics of a trailer of the vehicle-trailer system, or one or more steering inputs for the vehicle, determining a prediction based on yaw rate deviation for the vehicle determined from one or more of the vehicle characteristics, one or more of the trailer characteristics, or one or more of the steering inputs or hitch rate oscillation of a hitch coupling the vehicle to the trailer determined from one or more of the vehicle characteristics, one or more of the trailer characteristics, or one or more of the steering inputs, where the prediction may be indicative of a likelihood of instability for the vehicle-trailer system, and generating one or more control actions based on the prediction and hitch rate feedback from the hitch of the vehicle-trailer system or lateral hitch force feedback.

In one or more embodiments, one or more of the control actions may include implementation of a differential braking scheme, a symmetrical braking scheme, or trailer steering control actions. The method may include enabling or disabling stability control or one or more control actions based on a velocity of the vehicle and a low speed maneuverability cutoff threshold. The method may include actuating one or more steering actuators or one or more braking actuators based on one or more of the control actions. The method may include determining the yaw rate deviation based on a desired yaw rate and an actual yaw rate. The method may include determining the desired yaw rate based on a lookup table using a velocity of the vehicle and a steering angle of the vehicle as inputs for the lookup table.

According to one or more aspects, a system for stability control is provided, including a sensor component, a predictive component, a control component, and an actuation component. The sensor component may receive one or more vehicle characteristics of a vehicle of a vehicle-trailer system, one or more trailer characteristics of a trailer of the vehicle-trailer system, or one or more steering inputs for the vehicle. The predictive component may determine a prediction based on yaw rate deviation or hitch rate oscillation. The predictive component may determine yaw rate deviation for the vehicle based on one or more of the vehicle characteristics, one or more of the trailer characteristics, or one or more of the steering inputs.

The predictive component may determine hitch rate oscillation of a hitch coupling the vehicle to the trailer based on one or more of the vehicle characteristics, one or more of the trailer characteristics, or one or more of the steering inputs. The prediction may be indicative of a likelihood of instability for the vehicle-trailer system. The control component may generate one or more control actions based on the prediction and hitch rate feedback or lateral hitch force feedback. The sensor component may calculate a hitch rate of the hitch of the vehicle-trailer system. The lateral hitch force feedback may be received from the sensor component. The actuation component may implement one or more of the control actions via one or more steering actuators or one or more braking actuators.

In one or more embodiments, one or more of the control actions may include implementation of a differential braking scheme, a symmetrical braking scheme, or trailer steering control actions. The system may include a management component enabling or disabling stability control or one or more control actions based on a velocity of the vehicle and a low speed maneuverability cutoff threshold. The system may include an actuation component actuating one or more steering actuators or one or more braking actuators based on one or more of the control actions.

One or more embodiments of techniques or systems for stability control are provided herein. In one or more embodiments, a system or method for stability control is provided, such as a system for providing stability control to a vehicle towing a trailer or a vehicle-trailer system, for example. Stability control may be provided in a variety of ways. For example, a system for stability control may implement active stability control or passive stability control to facilitate stabilization of dynamics for a vehicle or trailer of a vehicle-trailer system. In one or more embodiments, one or more predictions may be made regarding jackknifing of a vehicle-trailer system. These jackknife predictions may be made based on one or more vehicle characteristics, one or more trailer characteristics, or one or more measured characteristics associated with yaw rate deviation between a vehicle and a trailer of a vehicle-trailer system or hitch rate oscillation of a trailer of a vehicle-trailer system.

Active control may be implemented by providing one or more control actions in response to one or more of the predictions or jackknife predictions. For example, one or more of the control actions may be provided based on or in response to a difference between a desired yaw rate and a measured yaw rate (e.g., utilizing yaw rate deviation). As another example, one or more of the control actions may be provided based on a yaw rate of the vehicle, a steering angle of the vehicle, a related transfer function, or a related resonant frequency (e.g., utilizing hitch rate oscillation). In any event, control actions may include one or more braking control actions, one or more steering control actions, implementing one or more braking schemes, such as a differential braking scheme, a symmetrical braking scheme, or an asymmetrical braking scheme. In this way, stability may be achieved by providing braking control or steering control for a trailer of a vehicle-trailer system.

Under the active approach for stability control, a system for stability control may utilize a symmetric braking approach, a differential braking approach, or a trailer steering approach to provide stability to a vehicle-trailer system. According to the symmetric braking approach, brakes of a trailer may be controlled such that a combined cornering force and braking force do not exceed a friction circle. In this way, symmetric braking may reduce a relative difference in yaw motion between a vehicle and an attached trailer, thereby mitigating jackknifing. Symmetric braking may indirectly generate a stabilizing moment about a hitch connecting the vehicle and the trailer, thereby generating a restoring or stabilizing moment for the trailer and reducing a hitch angle between the trailer and the vehicle.

Under the differential braking approach, differential braking may be applied or implemented on a trailer of a vehicle-trailer system to create a hitch tension and a yaw moment, thereby reducing a relative difference between a vehicle yaw rate of a vehicle and a trailer yaw rate of a trailer attached to the vehicle (e.g., measured in a hitch rate). Stated another way, differential braking may directly generate a stabilizing moment about a hitch. Additionally, trailer steering based on hitch rate feedback may be provided. By providing hitch rate feedback to a system for stability control, a hitch angle response may be dampened, such as a hitch angle response caused by cornering at high velocities, for example. Further, the system for stability control may increase a damping ratio, thereby reducing a chance of undesired oscillations in a hitch angle between the vehicle and the trailer of a vehicle-trailer system.

Under the passive approach for stability control, a system for stability control may apply damping (e.g., via a mechanical damper) to a hitch angle response. For example, damping of a hitch angle response or trailer oscillations may be achieved by direct actuation of a hitch angle through a mechanical damper.

One or more embodiments of techniques or systems for providing stability control are provided herein. One or more predictions or jackknife predictions may be generated based on yaw rate deviation (e.g., between a desired yaw rate and an actual yaw rate) or hitch rate oscillation (e.g., from a hitch rate signal). These predictions may be indicative of a likelihood of an accident, jackknifing, undesirable trailer oscillation, etc. When a prediction indicates that jackknifing is likely, feedback may be utilized to determine control actions to stabilize a vehicle-trailer system. For example, hitch rate feedback or lateral hitch force feedback may be provided from a sensor component. A control component may determine control actions which, when implemented, may reduce a destabilizing moment associated with a trailer of the vehicle-trailer system. In this manner, stability control is provided, thus enhancing stability technology for vehicles towing trailers.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system for stability control, comprising:
a sensor component receiving one or more vehicle characteristics of a vehicle of a vehicle-trailer system, one or more trailer characteristics of a trailer of the vehicle-trailer system, or one or more steering inputs for the vehicle;
a predictive component determining a prediction based on:
yaw rate deviation for the vehicle determined from one or more of the vehicle characteristics, one or more of the trailer characteristics, or one or more of the steering inputs; or
hitch rate oscillation of a hitch coupling the vehicle to the trailer determined from one or more of the vehicle characteristics, one or more of the trailer characteristics, or one or more of the steering inputs,
the prediction indicative of a likelihood of instability for the vehicle-trailer system; and
a control component generating one or more control actions based on the prediction and:

hitch rate feedback, wherein the sensor component calculates a hitch rate of the hitch of the vehicle-trailer system; or lateral hitch force feedback from the sensor component, wherein the sensor component, the predictive component, or the control component is implemented via a processing unit.

2. The system of claim 1, wherein one or more of the control actions comprises implementation of a differential braking scheme, a symmetrical braking scheme, or trailer steering control actions.

3. The system of claim 1, comprising a management component enabling or disabling stability control or one or more control actions based on a velocity of the vehicle and a low speed maneuverability cutoff threshold.

4. The system of claim 3, comprising a storage component storing the low speed maneuverability cutoff threshold.

5. The system of claim 1, comprising an actuation component actuating one or more steering actuators or one or more braking actuators based on one or more of the control actions.

6. The system of claim 1, wherein the predictive component determines the yaw rate deviation based on a desired yaw rate and an actual yaw rate, wherein the actual yaw rate is measured by the sensor component.

7. The system of claim 6, wherein the desired yaw rate is determined based on a lookup table using a velocity of the vehicle and a steering angle of the vehicle as inputs for the lookup table.

8. The system of claim 1, wherein the predictive component determines a hitch rate oscillation of the hitch based on a yaw rate of the vehicle, a steering angle of the vehicle, or an associated transfer function.

9. The system of claim 1, wherein the control component comprises a trailer steering controller generating one or more trailer steering control actions based on feedforward of a steering angle of the vehicle.

10. The system of claim 9, comprising a management component enabling or disabling stability control or one or more of the trailer steering control actions based on a velocity of the vehicle and a high speed steering cutoff threshold.

11. A method for stability control, comprising:
receiving one or more vehicle characteristics of a vehicle of a vehicle-trailer system, one or more trailer characteristics of a trailer of the vehicle-trailer system, or one or more steering inputs for the vehicle;
determining a prediction based on:
yaw rate deviation for the vehicle determined from one or more of the vehicle characteristics, one or more of the trailer characteristics, or one or more of the steering inputs; or
hitch rate oscillation of a hitch coupling the vehicle to the trailer determined from one or more of the vehicle characteristics, one or more of the trailer characteristics, or one or more of the steering inputs,
the prediction indicative of a likelihood of instability for the vehicle-trailer system; and generating one or more control actions based on the prediction and:
hitch rate feedback from the hitch of the vehicle-trailer system; or
lateral hitch force feedback,
wherein the receiving, the determining, or the generating is implemented via a processing unit.

12. The method of claim 11, wherein one or more of the control actions comprises implementation of a differential braking scheme, a symmetrical braking scheme, or trailer steering control actions.

13. The method of claim 11, comprising enabling or disabling stability control or one or more control actions based on a velocity of the vehicle and a low speed maneuverability cutoff threshold.

14. The method of claim 11, comprising actuating one or more steering actuators or one or more braking actuators based on one or more of the control actions.

15. The method of claim 11, comprising determining the yaw rate deviation based on a desired yaw rate and an actual yaw rate.

16. The method of claim 15, comprising determining the desired yaw rate based on a lookup table using a velocity of the vehicle and a steering angle of the vehicle as inputs for the lookup table.

17. A system for stability control, comprising:
a sensor component receiving one or more vehicle characteristics of a vehicle of a vehicle-trailer system, one or more trailer characteristics of a trailer of the vehicle-trailer system, or one or more steering inputs for the vehicle;
a predictive component determining a prediction based on:
yaw rate deviation for the vehicle determined from one or more of the vehicle characteristics, one or more of the trailer characteristics,
or one or more of the steering inputs; or
hitch rate oscillation of a hitch coupling the vehicle to the trailer determined from one or more of the vehicle characteristics, one or more of the trailer characteristics, or one or more of the steering inputs,
the prediction indicative of a likelihood of instability for the vehicle-trailer system;
a control component generating one or more control actions based on the prediction and:
hitch rate feedback, wherein the sensor component calculates a hitch rate of the hitch of the vehicle-trailer system; or
lateral hitch force feedback from the sensor component; and
an actuation component implementing one or more of the control actions via one or more steering actuators or one or more braking actuators,
wherein the sensor component, the predictive component, the control component, or the actuation component is implemented via a processing unit.

18. The system of claim 17, wherein one or more of the control actions comprises implementation of a differential braking scheme, a symmetrical braking scheme, or trailer steering control actions.

19. The system of claim 17, comprising a management component enabling or disabling stability control or one or more control actions based on a velocity of the vehicle and a low speed maneuverability cutoff threshold.

20. The system of claim 17, wherein the actuation component actuates one or more steering actuators or one or more braking actuators based on one or more of the control actions.

* * * * *